US012516543B2

(12) United States Patent
Owen, II et al.

(10) Patent No.: US 12,516,543 B2
(45) Date of Patent: Jan. 6, 2026

(54) ROTATABLE HANDLE FOR HVAC ACCESS PANELS

(71) Applicant: Johnson Controls Tyco IP Holdings LLP, Milwaukee, WI (US)

(72) Inventors: Lanson Delos Owen, II, Maize, KS (US); Lester Dale Sherrow, Wichita, KS (US)

(73) Assignee: JOHNSON CONTROLS LIGHT COMMERCIAL IP GMBH, Schaffhausen (CH)

( * ) Notice: Subject to any disclaimer, the term of this patent is extended or adjusted under 35 U.S.C. 154(b) by 481 days.

(21) Appl. No.: 17/726,353

(22) Filed: Apr. 21, 2022

(65) Prior Publication Data

US 2023/0340802 A1 Oct. 26, 2023

(51) Int. Cl.
*E05B 3/00* (2006.01)
*E05B 1/00* (2006.01)
(Continued)

(52) U.S. Cl.
CPC ................ *E05B 3/00* (2013.01); *E05B 1/003* (2013.01); *E05C 3/042* (2013.01); *F24F 13/20* (2013.01)

(58) Field of Classification Search
CPC ........ E05B 15/1635; E05C 3/00; E05C 3/045; E05C 3/042; E05C 19/06; Y10S 292/38;
(Continued)

(56) References Cited

U.S. PATENT DOCUMENTS 858,091 A 6/1907 Merriweather
4,186,952 A 2/1980 Glass
(Continued)

OTHER PUBLICATIONS

Zoro, "Keyless Wing-Handle Cam Locks, Straight for Material Thickness 15/64 in", Compx Fort-MFWTT058, 5 pages, https://www.zoro.com/compx-fort-keyless-wing-handle-cam-locks-straight-for-material-thickness-1564-in-mfwtt058/i/G1421551/#description.

*Primary Examiner* — Christine M Mills
*Assistant Examiner* — Yahya Sidky
(74) *Attorney, Agent, or Firm* — Fletcher Yoder, P.C.

(57) ABSTRACT

A handle for an access panel of a heating, ventilation, and air conditioning (HVAC) system includes a handle portion configured to be disposed on a first side of the access panel. The handle portion includes a first prong comprising a first tooth and a second prong comprising a second tooth. The first prong and the second prong are configured to extend through the access panel. The handle also includes a latch portion configured to be disposed on a second side of the access panel. The latch portion includes a passage extending therethrough and configured to receive the first prong and the second prong. The latch portion includes a first tooth recess and a second tooth recess. The first tooth is configured to engage with the first tooth recess and the second tooth is configured to engage with the second tooth recess to secure the handle portion and the latch portion to one another and to secure the handle to the access panel in an installed configuration of the handle. The handle also includes a gasket configured to be disposed between the handle portion and the latch portion in the installed configuration of the handle. The handle is adjustable, relative to the access panel, between a first position and a second position in the installed configuration.

19 Claims, 17 Drawing Sheets

(51) Int. Cl.
*E05C 3/04* (2006.01)
*F24F 13/20* (2006.01)

(58) Field of Classification Search
CPC ......... Y10T 292/1043; Y10T 292/1075; Y10T 292/1078; Y10T 292/0911; Y10T 292/0945; Y10T 292/0948; Y10T 292/0894; Y10T 292/0895
See application file for complete search history.

(56) References Cited

U.S. PATENT DOCUMENTS

| | | | | |
|---|---|---|---|---|
| 5,630,632 | A * | 5/1997 | Swan | E05B 9/08<br>292/202 |
| 6,305,725 | B1 * | 10/2001 | Antonucci | E05B 65/006<br>292/DIG. 53 |
| 2010/0276946 | A1 * | 11/2010 | Whetten | H01M 50/262<br>292/102 |
| 2020/0087948 | A1 * | 3/2020 | Trammell | E05B 65/006 |

* cited by examiner

ROTATABLE HANDLE FOR HVAC ACCESS PANELS

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

A heating, ventilation, and air conditioning (HVAC) system may be used to control environmental conditions in a conditioned space. For example, residential, light commercial, commercial, and industrial HVAC systems are used to control environmental conditions, such as temperature and air quality, in residences and other structures. Certain HVAC systems can be dedicated to either heating or cooling, although many HVAC systems are capable of performing both functions. In general, HVAC systems operate by implementing a thermal cycle in which a refrigerant undergoes alternating phase changes within a refrigerant circuit to remove heat from or deliver heat to a conditioned interior space of a structure. Similar systems are used for vehicle heating and cooling, and as well as for other types of general refrigeration, such as refrigerators, freezers, and chillers.

In some applications, an HVAC system may include an enclosure, such as an outdoor unit enclosure, configured to separate one or more HVAC system components from an external environment. Certain enclosures may include an access panel configured to allow a user to access the HVAC system components contained in an interior of the enclosure. The access panel may include a handle coupled thereto that may be used to open and close the access panel. Handles are frequently installed with access panels using tools, which may increase the time and difficulty of installation.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a handle for an access panel of a heating, ventilation, and air conditioning (HVAC) system includes a handle portion configured to be disposed on a first side of the access panel. The handle portion includes a first prong comprising a first tooth and a second prong comprising a second tooth. The first prong and the second prong are configured to extend through the access panel. The handle also includes a latch portion configured to be disposed on a second side of the access panel. The latch portion includes a passage extending therethrough and configured to receive the first prong and the second prong. The latch portion includes a first tooth recess and a second tooth recess. The first tooth is configured to engage with the first tooth recess and the second tooth is configured to engage with the second tooth recess to secure the handle portion and the latch portion to one another and to secure the handle to the access panel in an installed configuration of the handle. The handle also includes a gasket configured to be disposed between the handle portion and the latch portion in the installed configuration of the handle. The handle is adjustable, relative to the access panel, between a first position and a second position in the installed configuration.

In another embodiment, a heating, ventilation, and air conditioning (HVAC) system includes an enclosure having an access panel configured to enable selective access to an interior volume of the enclosure and includes a latch assembly coupled to the access panel. The latch assembly is configured to engage and disengage with the enclosure to enable securement of the access panel in a closed position. The latch assembly includes a handle portion comprising a base, a grip portion extending from the base in a first direction, a plurality of ribs extending from the base in a second direction opposite the first direction, a first prong and a second prong extending from the base in the second direction, a first tooth extending from the first prong, and a second tooth extending from the second prong. The latch assembly also includes a latch portion comprising a main body, a passage extending through the body, a first tooth recess formed in the latch portion, and a second tooth formed in the latch portion. The first prong and the second prong extend through the access panel and into the passage, the first tooth is disposed within the first tooth recess, and the second tooth is disposed within the second tooth recess to secure the handle portion and the latch portion to one another and to the access panel.

In another embodiment, a heating, ventilation, and air conditioning (HVAC) system includes a latch configured to couple to an access panel of the HVAC system. The latch includes a first portion configured to be disposed on a first side of the access panel. The first portion comprises a handle, a first prong having a first tooth, and a second prong having a second tooth. The first prong and the second prong are configured to extend through an opening of the access panel. The latch also includes a second portion configured to be disposed on a second side of the access panel. The second portion comprises a latch body, a passage formed in the latch body, a first tooth recess formed in a distal end of the latch body, and a second tooth recess formed in the distal end of the latch body. The first prong and the second prong are configured to be disposed within the passage and the first tooth and the second tooth are configured to engage with the first tooth recess and the second tooth recess, respectively, to secure the first portion and the second portion to one another and to the access panel in an installed configuration. The latch is configured to rotate, relative to the access panel, between a first position and a second position to engage and disengage, respectively, with an enclosure of the HVAC system to enable selective securement of the access panel to the enclosure in a closed position.

DRAWINGS

Various aspects of this disclosure may be better understood upon reading the following detailed description and upon reference to the drawings in which.

DETAILED DESCRIPTION

Figure 1:
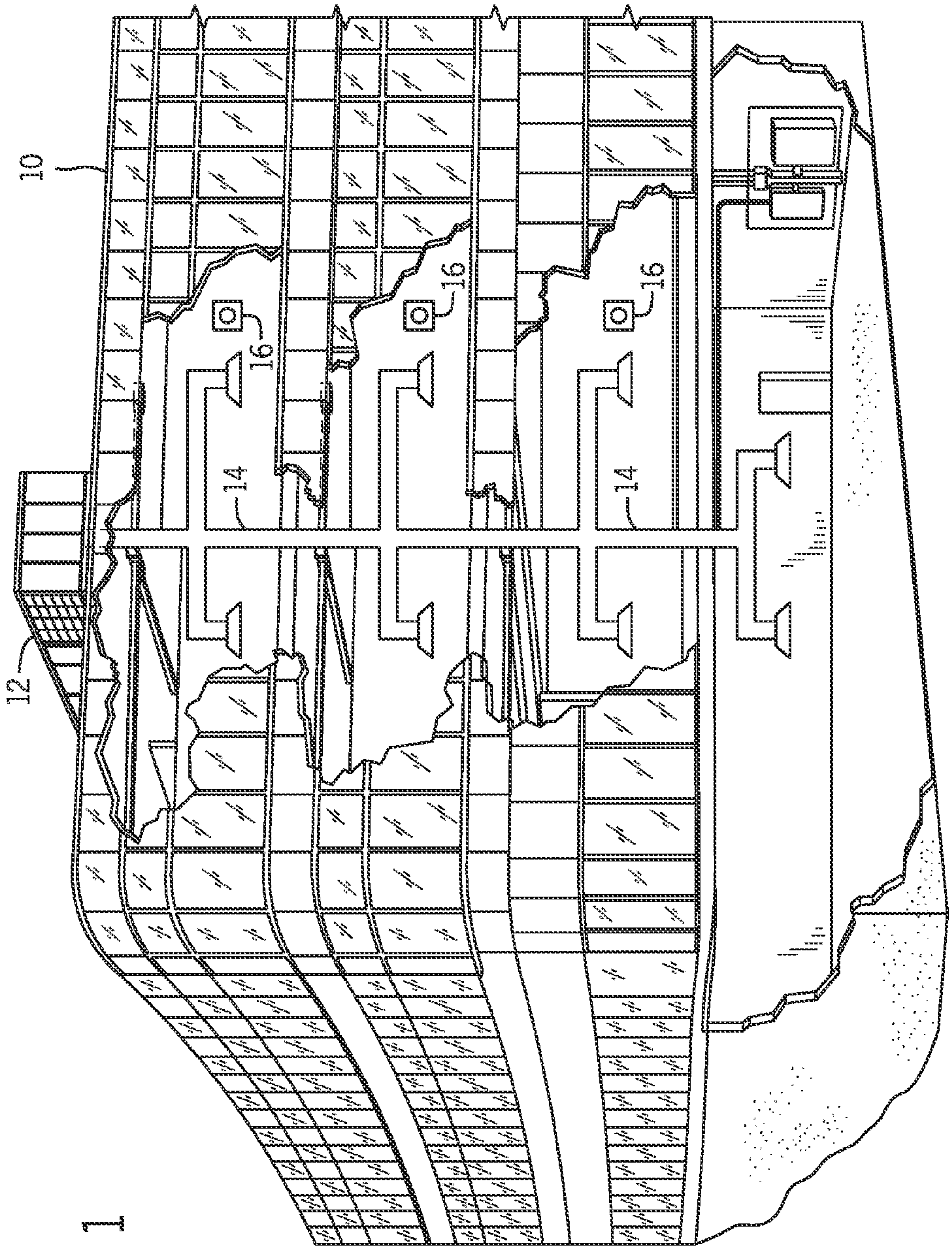
FIG. 1 is a perspective view of an embodiment of a building having a heating, ventilation, and air conditioning (HVAC) system for building environmental management that may employ one or more HVAC units, in accordance with aspects of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As will be discussed in further detail below, heating, ventilation, and air conditioning (HVAC) systems often include enclosures that separate components within the enclosure (e.g., internal components) from an external environment, for example, to protect the internal components from the external environment. For example, the internal components may include heat exchange equipment of a vapor compression system, control systems, sensors, and so forth. An enclosure may include an access panel to enable a user to selectively access the internal components within the enclosure. The access panel may also include a handle to enable the user to open and close the panel or otherwise adjust the access panel relative to the enclosure. In some applications, the handle may be actuatable (e.g., rotatable) to engage with the access panel and secure or retain the access panel in a closed position (e.g., against the enclosure). As mentioned above, traditional handles may be coupled to an access panel via fasteners or other features that are installed using tools, which may complicate installation of the handle with the access panel and increase installation cost. Therefore, there is a need for an improved handle that may be readily installed without the use of tools.

Accordingly, present embodiments are directed to a handle assembly including a handle portion and a latch portion that are adjustable relative to one another (e.g., to accommodate a particular thickness of a particular access panel) and that may be installed without the use of tools. In the manner described below, the present embodiments enable installation of an access panel handle on different panels without the use of tools, which may simplify installation procedures, reduce time for installation, and reduce costs (e.g., tool costs) associated with installation.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by an HVAC system 11 having an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, which includes an outdoor HVAC unit and an indoor HVAC unit.

The HVAC unit 12 is an air-cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
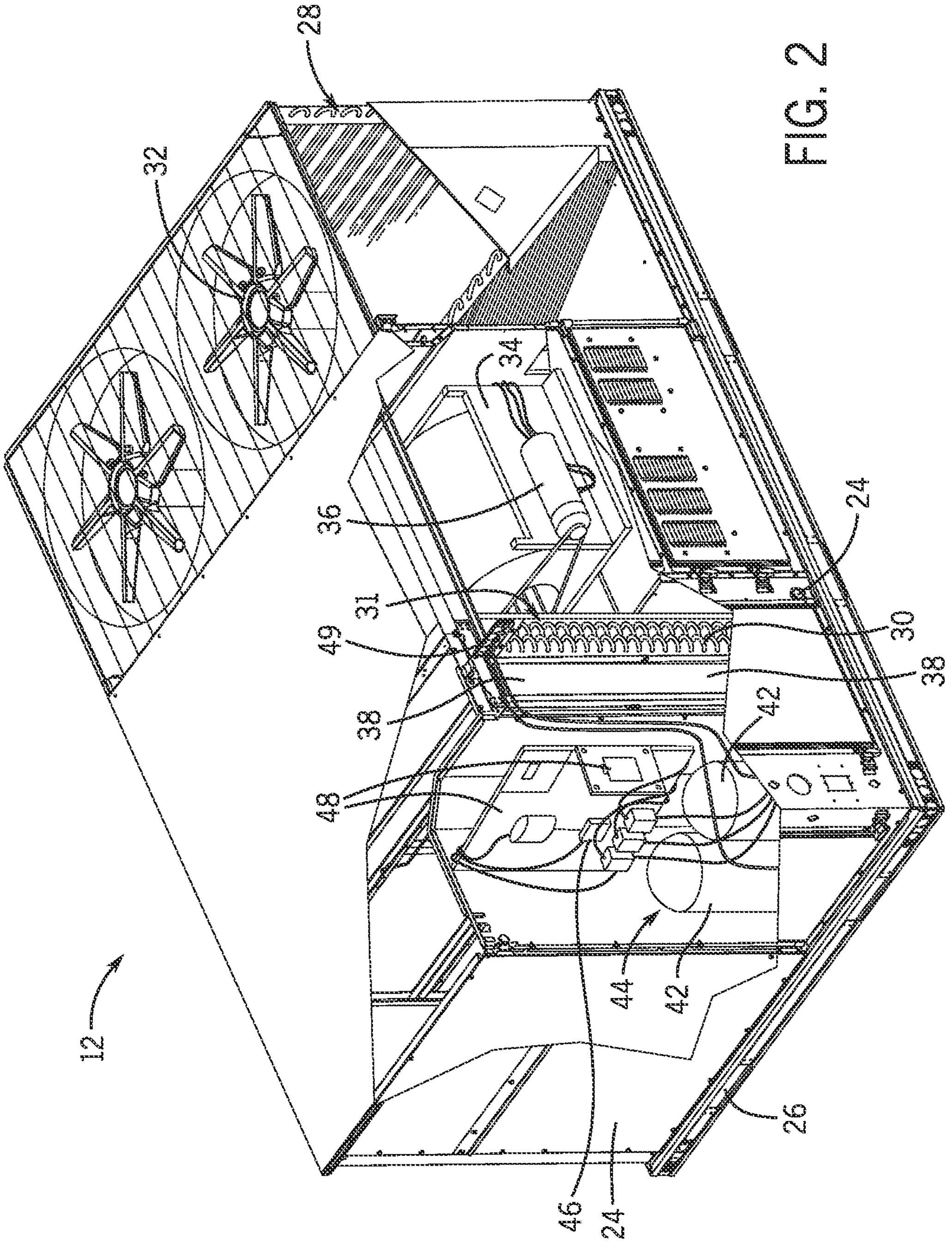
FIG. 2 is a perspective view of an embodiment of a packaged HVAC unit, in accordance with aspects of the present disclosure.

FIG. 2 is a perspective view of an embodiment of the HVAC unit 12 that includes a flash gas bypass system in accordance with present embodiments. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the HVAC unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
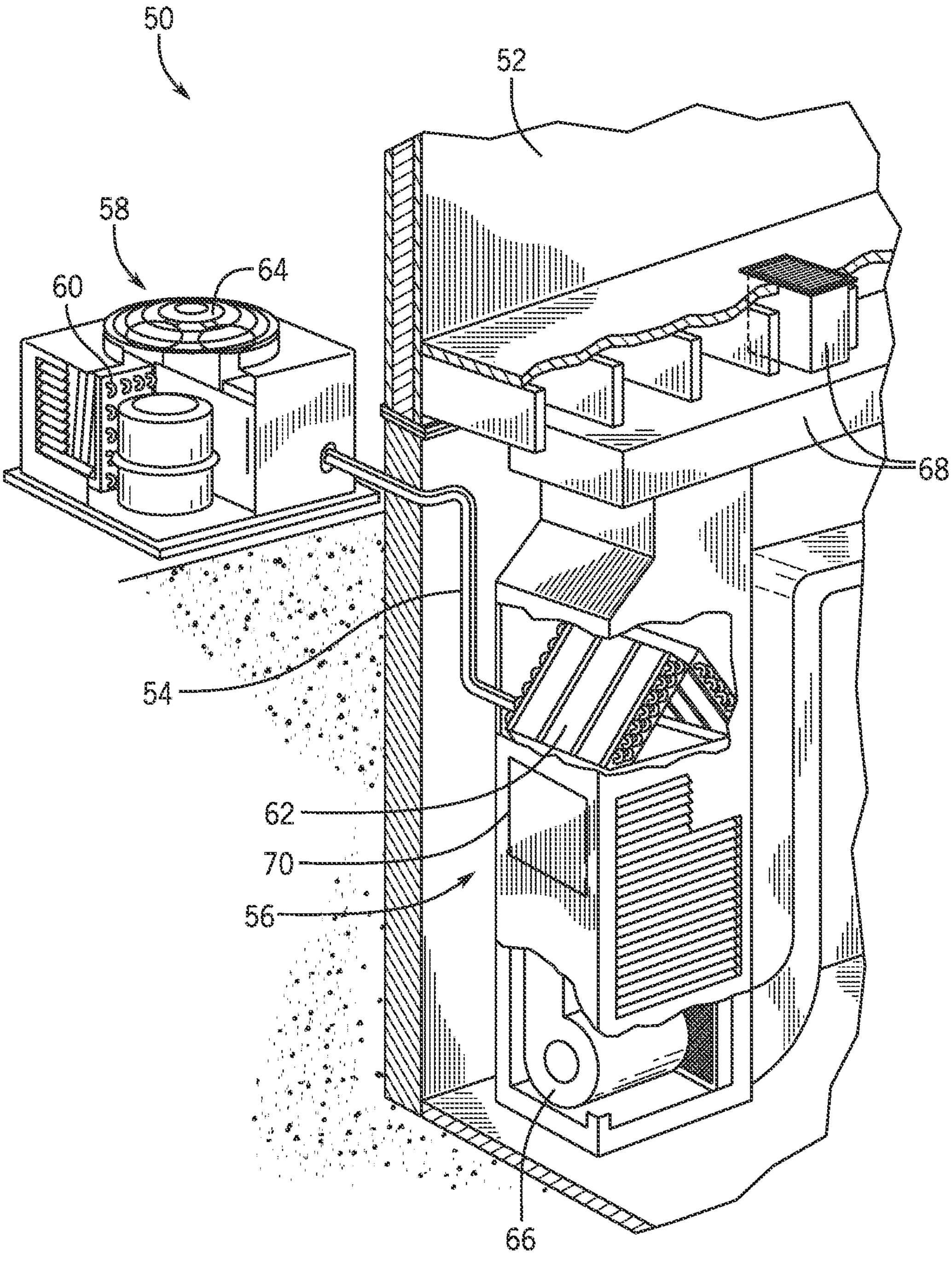
FIG. 3 is a perspective view of an embodiment of a split, residential HVAC system, in accordance with aspects of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
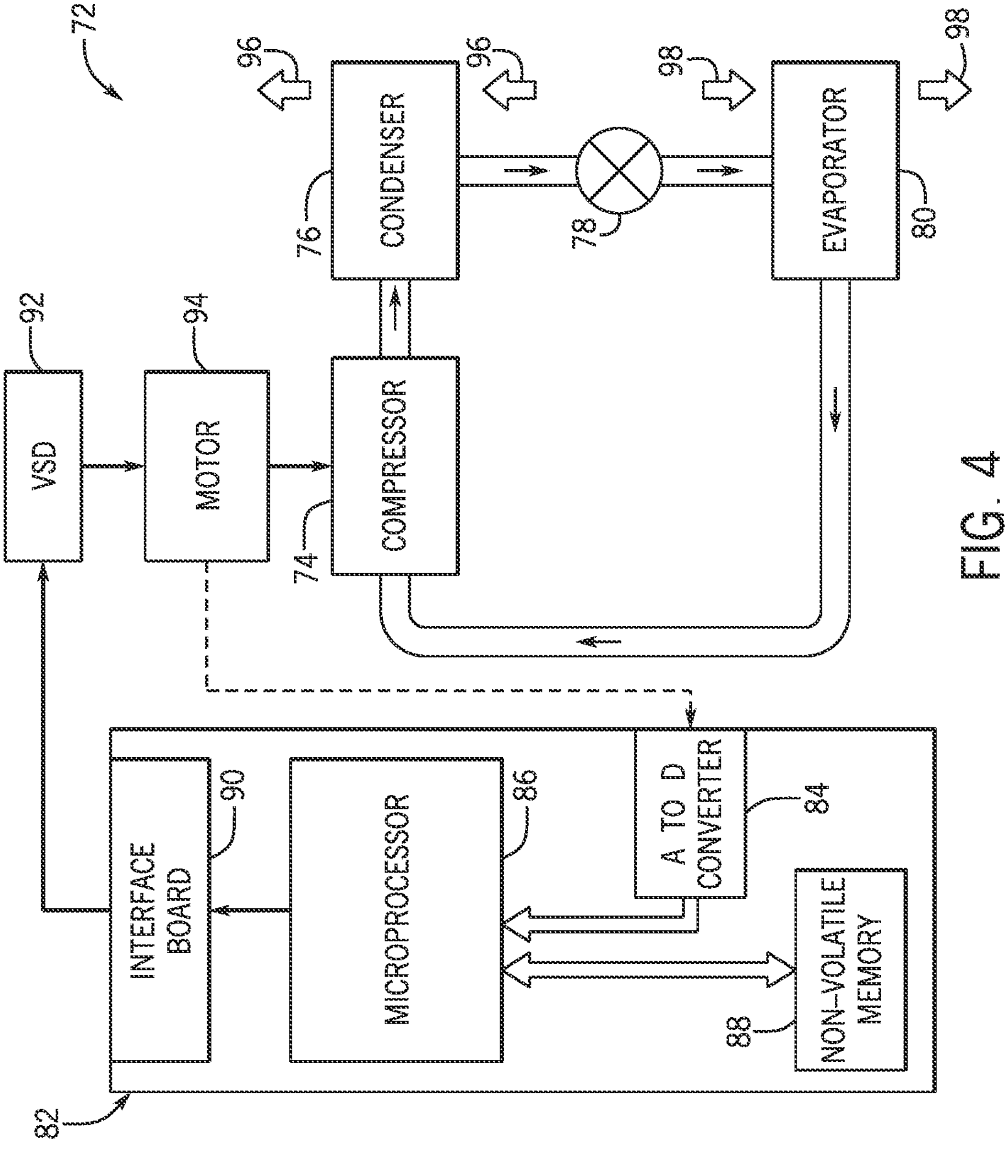
FIG. 4 is a schematic of an embodiment of a vapor compression system used in an HVAC, in accordance with aspects of the present disclosure.

FIG. 4 is a schematic of an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As mentioned above, present embodiments are directed to a handle assembly for a panel (e.g., access panel) of an enclosure, such as enclosure of an HVAC system (e.g., HVAC unit 12, indoor unit 56, outdoor unit 58, etc.). In particular, the handle assembly is configured to be installed with a variety of access panels that each may have a different thickness. The handle assembly may also be installed without the use of tools. As described in detail below, the disclosed embodiments of the handle assembly include a handle portion configured to be installed on or at an outer surface of an access panel. The handle portion includes a protrusion that extends through an opening (e.g., aperture) formed in the access panel in an installed configuration of the handle assembly. The protrusion also includes a plurality of teeth arrayed along the protrusion. Each tooth is configured to engage with a pawl of a latch portion of the handle assembly, which may be disposed on or at an inner surface of the access panel in the installed configuration of the handle assembly. As described further below, the engagement between the one of the teeth and the pawl secures the handle assembly (e.g., the handle portion and the latch portion) to the access panel in the installed configuration. Moreover, as the pawl may engage (e.g., separately engage) with each of the teeth along the protrusion, the handle assembly to be secured to a variety of panels having varying thicknesses. Thus, the present embodiments enable the installation of the handle assembly with a variety of access panels having different thicknesses without the use of tools. In this way, costs associated with manufacture and assembly of HVAC systems having the access panel may be reduced.

In another embodiment, the handle portion includes a pair of prongs that extend through the opening formed in the access panel in an installed configuration of the handle assembly. Each prong includes a tooth extending from a body portion of the prongs. Each tooth is configured to engage with a tooth recess of the latch portion. As described further below, the engagement between the teeth and the tooth recesses secures the handle assembly to the access panel in the installed configuration. Thus, the present embodiments enable the installation of the handle assembly with an access panel without the use of tools. In this way, costs associated with assembly of HVAC systems having the access panel may be reduced.

Figure 5:
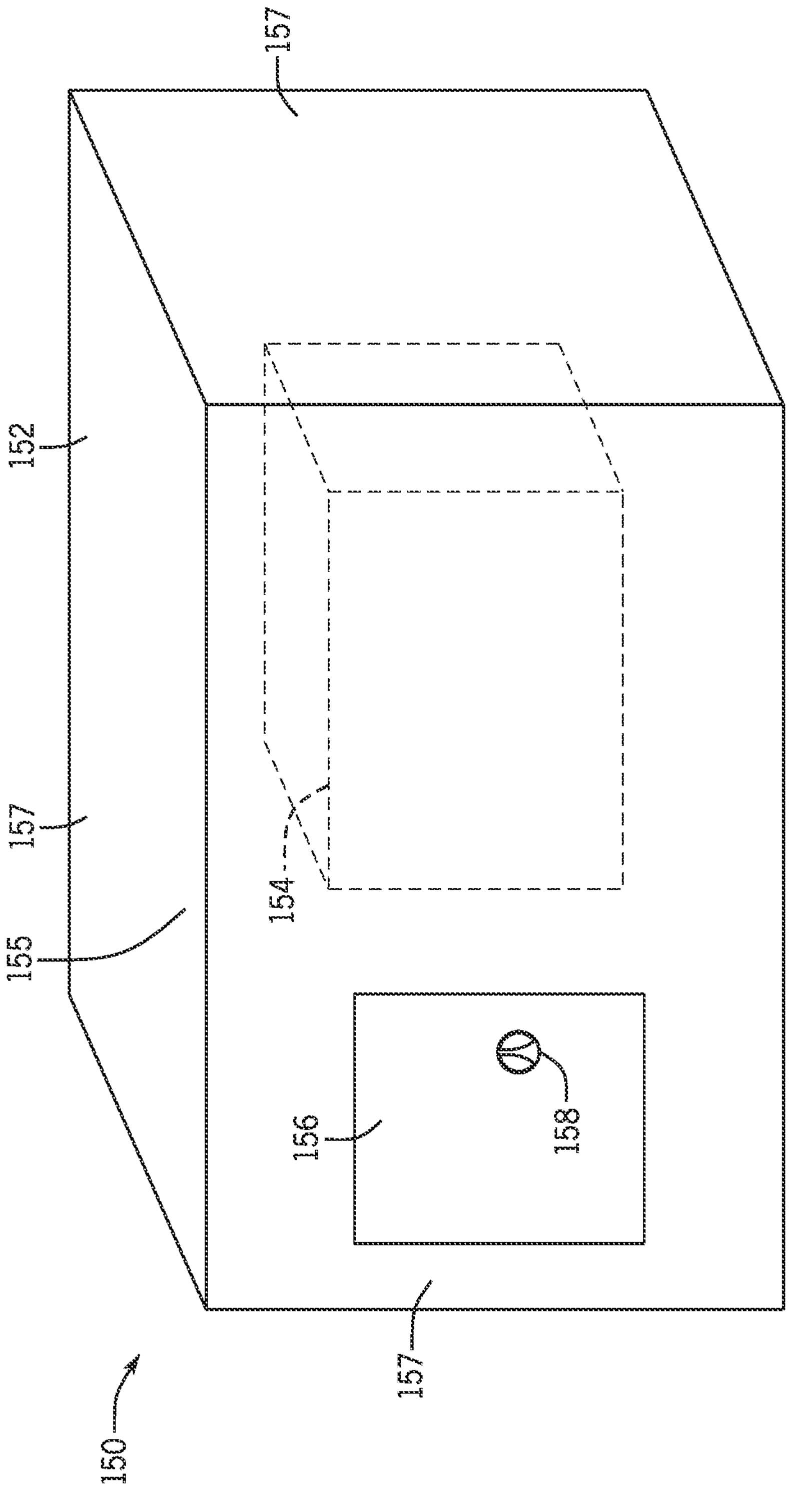
FIG. 5 is a schematic perspective view of an embodiment of an enclosure of an HVAC system, illustrating an access panel and a handle assembly of the enclosure, in accordance with aspects of the present disclosure.

With the foregoing in mind, FIG. 5 is a perspective view of an embodiment of an HVAC system 150 having an enclosure 152 (e.g., enclosure assembly) with one or more internal components 154 disposed therein. For example, the HVAC system 150 may be an embodiment of the HVAC unit 12, the indoor unit 56, or the outdoor unit 58 described above. In other embodiments, the HVAC system 150 may be an air handler, a furnace, or other HVAC system. The one or more internal components 154 may be equipment configured to enable conditioning of an air flow provided to a conditioned space. In some embodiments, the internal component 154 may include a heat exchanger, a fan, a motor, a blower assembly, a component of the vapor compression system 72, or a combination thereof.

As mentioned above, the enclosure 152 may be a housing, cabinet, or other structure configured contain the internal component 154, as well as other components, and may be configured to protect or shield an interior volume 155 of the enclosure 152, and thus the internal component 154, from an external environment surrounding the enclosure 152. For example, the enclosure 152 may include a plurality of walls 157, panels, sheets, or other members that separate the external environment from the interior volume 155. The walls 157 may be constructed of sheet metal, polymer sheets, or other suitable materials. The enclosure 152 may also include other features, such as an insulation layer, framing or other support structure, and so forth. The enclosure 152 may block external debris, precipitation, and/or other environmental elements from entering the interior volume 155, block heat transfer between the interior volume 155 and the external environment, block inadvertent or unauthorized access to the interior volume 155, and so forth.

In some instances, access to the interior volume 155 may be desired. For example, a user (e.g., a technician) may wish to access the interior volume 155 and/or the internal component 154 in order to, for example, perform maintenance, replacement, installation, testing, diagnostic, or other procedures associated with the HVAC system 150. To this end, the enclosure 152 also includes an access panel 156 having a handle assembly 158 (e.g., a handle, a latch, a latch assembly, rotatable handle, etc.). The access panel 156 may be manipulated (e.g., rotated, pivoted, slid, removed, opened, closed, etc.) relative to the enclosure 152 (e.g., the walls 157) to enable access to the interior volume 155 of the enclosure 152. As described herein, the handle assembly 158 may enable manipulation of the access panel 156 relative to the enclosure 152. In some embodiments, the handle assembly 158 may be gripped by the user and pushed, pulled, or otherwise actuated to transition the access panel 156 from a closed position to an open position and vice versa. Further, the handle assembly 158 may be configured to retain the access panel 156 in the closed position (e.g., against the enclosure 152 and/or one of the walls 157) to block unauthorized and/or inadvertent access to the interior volume 155. As described in detail below, present embodiments of the handle assembly 158 are also configured to be installed with different embodiments of the access panel 156 that have different thicknesses, and the handle assembly 158 may be installed without the use of tools or additional fasteners. Indeed, the handle assembly 158 is configured to self-secure to the access panel 156 and accommodate each of a variety of possible thicknesses of the access panel 156.

Figure 6:
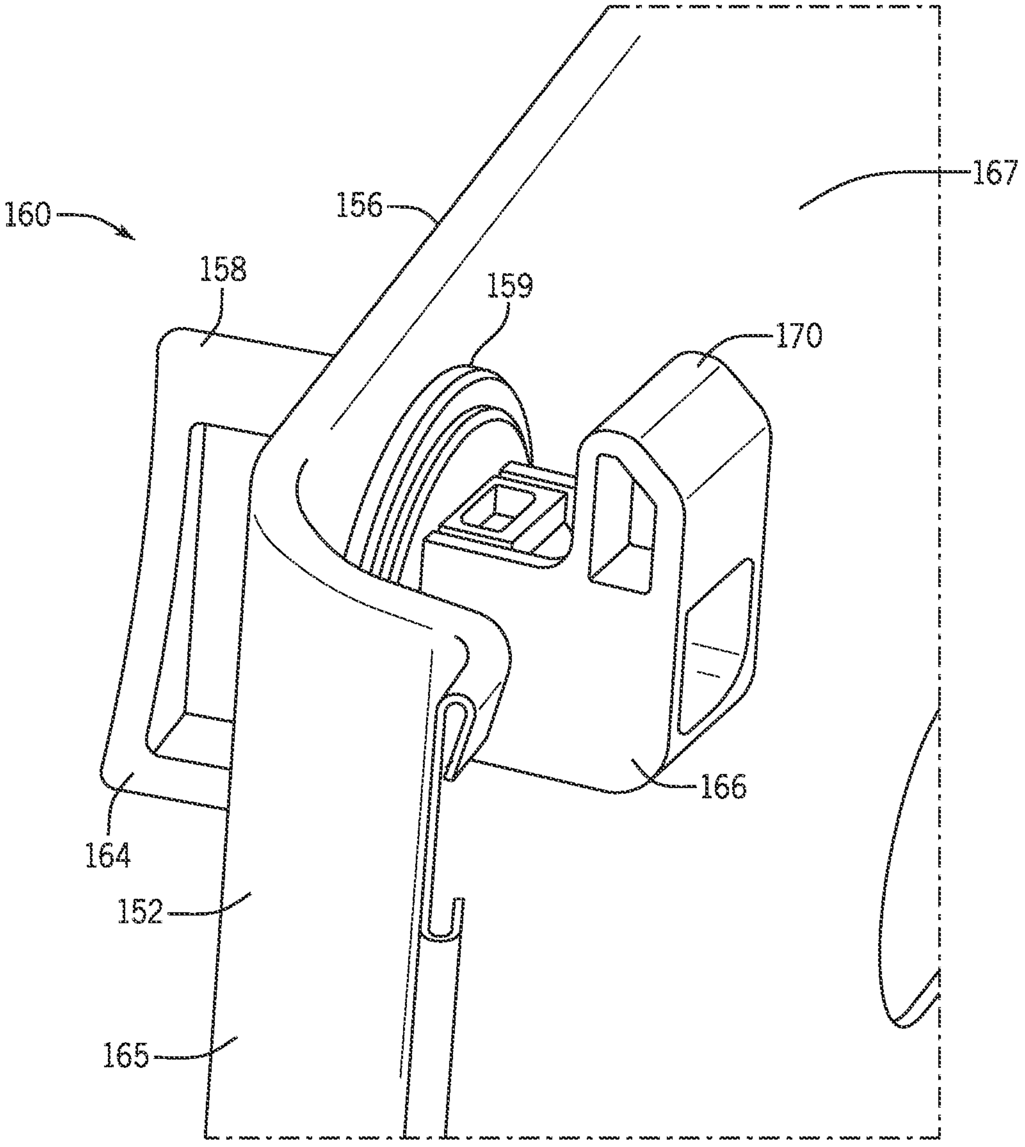
FIG. 6 is a perspective view of an embodiment of an access panel and a handle assembly, illustrating an installed configuration of the handle assembly with the access panel, in accordance with aspects of the present disclosure.

FIG. 6 is a perspective view of an embodiment of the access panel 156 and handle assembly 158, illustrating an installed configuration of the handle assembly 158 with the access panel 156. In some embodiments, the handle assembly 158 (e.g., components of the handle assembly 158) may be a single piece formed from a polymer manufactured by injection molding, compression molding, additive manufacturing (e.g., three-dimensional (3D) printing), machining, or another suitable manufacturing technique. Alternatively, the handle assembly 158 may be formed from metal, a composite material, or the like. The handle assembly 158 may include a handle portion 164 and a latch portion 166 that, in an installed configuration, may be disposed on opposite sides of the access panel 156 relative to one another. In particular, the handle portion 164 is disposed on and/or against an exterior surface 165 (e.g., exterior side, first side) of the access panel 156, and the latch portion 166 is disposed on and/or against an interior surface 167 (e.g., interior side, second side) of the access panel 156. In a closed configuration of the access panel 156, the interior surface 167 may face the interior volume 155 of the enclosure 152, and the exterior surface 165 may face an environment surrounding the enclosure 152.

Further, in the manner described below, the handle portion 164 and the latch portion 166 may be secured to one another to couple the handle assembly 158 to the access panel 156. For example, a portion of the handle portion 164 may extend through an opening 159 in the access panel 156 to engage with the latch portion 166. The handle portion 164 and the latch portion 166 may be secured to one another such that the handle portion 164 is disposed against the exterior surface 165 of the access panel 156, the latch portion 166 is disposed against the interior surface 167, and the access panel 156 is captured between the handle portion 164 and the latch portion 166.

Once the handle assembly 158 is installed with the access panel 156, a user may grip the handle portion 164 to manipulate a position of the access panel 156 relative to the enclosure 152. Additionally, as the handle portion 164 and latch portion 166 may be rotationally fixed relative to one another, the user may rotate the handle portion 164 to thereby rotate the latch portion 166. In order to secure the access panel 156 in a closed position, the latch portion 166 may include a hook 170 configured to selectively engage with the enclosure 152. For example, the hook 170 may be a lateral extension extending from a main body of the latch portion 166. Rotation of the handle assembly 158 may transition the handle assembly 158 between an unlocked position (e.g., a disengaged position) and a locked position (e.g., an engaged position). When the access panel 156 is in a closed position with the enclosure 152 and the hook 170 is in the locked position, the hook 170 may engage with one of the walls 157 of the enclosure 152, with an additional structure of the wall 157, another structural member of the enclosure 152, or any other suitable feature. In some embodiments, the hook 170 may be elastically deform in the locked position, such as via engagement with the wall 157. This deformation may maintain the handle assembly 158 in the locked position and may reduce vibration or another force that may inadvertently dislodge and/or transition the handle assembly 158 into an unlocked position.

Figure 7:
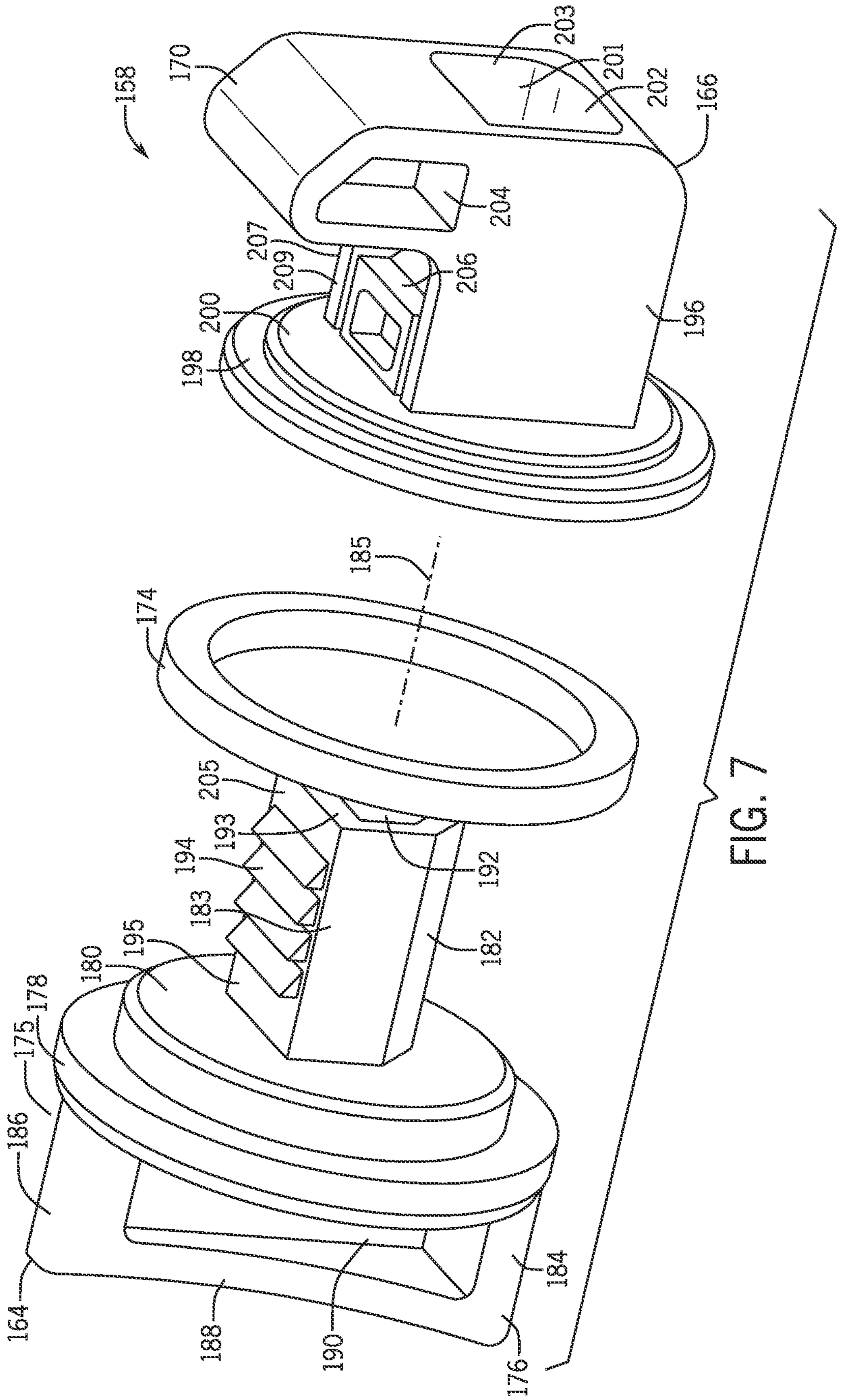
FIG. 7 is an exploded perspective view of an embodiment of a handle assembly, in accordance with aspects of the present disclosure.

FIG. 7 is an exploded perspective view of an embodiment of the handle assembly 158, illustrating the handle portion 164, the latch portion 166, and a gasket 174 of the handle assembly 158. The gasket 174 may be included to create a seal between the handle assembly 158 and the access panel 156 in the installed configuration shown in FIG. 6. For example, the gasket 174 may block transfer of air, heat, and/or debris between the external environment and the interior volume 155 of the enclosure 152. The gasket 174 may be composed of a polymer, elastomer, soft metal, closed cell foam, or any other compressible material suitable for establishing a sealing interface between components. In an installed configuration, the gasket 174 may be disposed between the handle portion 164 and the access panel 156, between the latch portion 166 and the access panel 156, between the handle portion 164 and the latch portion 166 (e.g., and within the opening 159 of the access panel 156), or any combination thereof. In one embodiment, multiple gaskets 174 may be included with the handle assembly 158. For example, one gasket 174 may be disposed between the handle portion 164 and the exterior surface 165 of the access panel 156, and another gasket 174 may be disposed between the interior surface 167 and the latch portion 166. When the handle assembly 158 is disassembled, the handle portion 164, the latch portion 166, and the gasket 174 may be separate from one another.

As shown in the illustrated embodiment, the handle portion 164 may include a main body 175, a grip portion 176 (e.g., gripping portion, grip extension, etc.), a base 178 (e.g., cylindrical base), a base extension 180 (e.g., cylindrical base extension), and a protrusion 182, each of which may be integrally formed with one another to form the handle portion 164. A user may manipulate the grip portion 176 to rotate the handle assembly 158 between a locked position and an unlocked position, open and close the access panel 156, and/or assemble and disassemble the handle assembly 158 (e.g., install and uninstall the handle assembly 158 with the access panel 156). The grip portion 176 may have a grip base 184, a grip point 186, one or more grip side surfaces 188, and one or more grip side cavities 190 formed in the one or more grip side surfaces 188. The grip portion 176 and the features of the grip portion 176 may be attached to or integrally formed with the base 178 and may face an environment external to the enclosure 152 when installed with the access panel 156. The grip base 184 may be an integral piece of the grip portion 176 located on a lateral side or edge of the handle portion 164 that is generally opposite the grip point 186. The grip base 184 may have a flat or curved surface spanning an edge of the handle portion 164 (e.g., along an arc of a circumference of the base 178) distal to a rotational or central axis 185 of the handle portion 164. The grip point 186 may be disposed on a side of the grip portion 176 generally opposite the grip base 184 and may also be an integral portion of the handle portion 164.

Additionally, the grip point 186 may have a smaller circumferential dimension (e.g., arc length of the circumference of the base 178, smaller thickness, etc.) than that of the grip base 184. As a result, the grip portion 176, when viewed from an exterior of the enclosure 152, may resemble a triangle or arrowhead shape. The grip point 186 may be aligned in a common direction with the hook 170 so that the grip portion 176 may be a visual indicator of an orientation of the hook 170 in an installed configuration of the handle assembly 158 with the access panel 156. In this way, a user may view the grip portion 176 from a location external to the enclosure 152 (e.g., with the latch portion 166 obscured by the access panel 156) and determine an orientation of the hook 170 to verify whether the handle assembly 158 is in a locked or unlocked position.

Additionally, the one or more grip side surfaces 188 may extend from the grip base 184 to the grip point 186 (e.g., two grip side surfaces 188 extending on opposing sides of the grip portion 176). The grip side surfaces 188 may be flat or curved and may surround or extend about one or more grip side cavities 190. The one or more grip side cavities 190 may be located on one or more sides (e.g., formed within one or more grip side surfaces 188) of the grip portion 176 and may accommodate one or more fingers of a user to enable the user to grip the handle portion 164 via the grip portion 176. In some embodiments, one or more surfaces of the grip portion 176 (e.g., grip side surfaces 188) may be textured or include a surface treatment to improve manual gripping of the grip portion 176. Furthermore, it should be understood that the geometry of the grip portion 176 may have other configurations, shapes, features, and so forth different than those described above.

The base 178 of the handle portion 164 may be generally cylindrical in shape. Alternatively, the base 178 may have a cross-sectional or other geometry (e.g., profile) that is rectilinear, triangular, octagonal, or any other suitable shape. Additionally, the base 178 may, in an installed configuration, be disposed against the exterior surface 165 of the access panel 156 and may be at least partially disposed about the opening 159 (e.g., circular opening) formed in the access panel 156. The base extension 180 may extend from the base 178 in a direction away from (e.g., opposite that of) the grip portion 176. The base extension 180 may also be cylindrical in shape, may have a smaller profile (e.g., smaller diameter) than the base 178 and may have a central axis collinear and/or aligned with the central axis 185 of the base 178.

The base extension 180, in an installed configuration of the handle assembly 158, may extend into and/or through the opening 159 formed in the access panel 156. In one embodiment, a surface of the base extension 180 may be in contact with an edge (e.g., circumferential edge, internal surface) of the opening 159 of the access panel 156 in the installed configuration. To facilitate rotation of the handle assembly 158 within the opening 159 of the access panel 156, the base extension 180 may be manufactured to have one or more smooth surfaces configured to abut the edge of the opening 159. Additionally or alternatively, the handle assembly 158 may be installed with the access panel 156 with a lubricant and/or coating disposed on the base extension 180 to facilitate rotation of the handle assembly 158 within the opening 159.

The protrusion 182 may extend from the base extension 180 in a direction away from (e.g., opposite that of) the grip portion 176. To couple the handle portion 164 to the latch portion 166 and thereby couple the handle assembly 158 to the access panel 156, the handle portion 164 may be positioned adjacent to the exterior surface 165 of the access panel 156 and aligned with the opening 159 in the access panel 156 (e.g., along the central axis 185), such that protrusion 182 extends through the opening 159 in the access panel 156. The latch portion 166 may be positioned adjacent the interior surface 167 of the access panel 156 and aligned with the opening 159 in the access panel 156 (e.g., along the central axis 185). In this way, the protrusion 182 may be received by the latch portion 166, as described further below. The protrusion 182 may have an outer surface 183 defining a cross-sectional geometry or profile of the protrusion 182. The protrusion 182 may have a protrusion cavity 192 formed in and/or extending into a body of the protrusion 182. The protrusion cavity 192 may extend from a surface 193 (e.g., distal surface) of the protrusion 182 facing the interior volume 155 of the enclosure 152. In some embodiments, the protrusion cavity 192 may extend from the surface 193 to the base extension 180 or the base 178. For example, the handle portion 164 may be formed via an additive manufacturing (e.g., three-dimensional printing) process, a molding process, or other suitable process and may include the protrusion cavity 192 to reduce a material cost (e.g., material usage) associated with the handle assembly 158. As shown, the protrusion 182 may also have one or more teeth 194 arrayed along one or more sides 195 (e.g., a top side) of the protrusion 182. For example, the one or more teeth 194 may be arrayed along and/or aligned relative to the central axis 185 of the handle portion 164 (e.g., the base 178, the base extension 180, and/or the protrusion 182). The teeth 194 may be integrally formed with the protrusion 182 and may engage with the latch portion 166 in an installed configuration, as described below.

In the illustrated embodiment, the latch portion 166 includes a body 196 (e.g., a main body, latch body, etc.), a base portion 198, a base portion extension 200, a passage 202 (e.g., an opening, an aperture, etc.) formed in the body 196, the hook 170, a hook cavity 204, and an opening 206 (e.g., tooth slot, recess, window, aperture, etc.). In some embodiments, the latch portion 166 may be a single, integrally-formed piece having one or more of the features described herein. The body 196 may be a central section of material of any suitable shape, and the passage 202 may extend through the body 196. The passage 202 may be defined by an inner surface 201 having a cross-sectional geometry corresponding to the protrusion 182. The base portion 198, similar to the base 178, may be cylindrical in shape and may be disposed against the interior surface 167 of the access panel 156 in the installed configuration of the handle assembly 158. The base portion extension 200 may extend from the base portion 198 and may also be cylindrical in shape. The passage 202 may extend through (e.g., entirely through) the base portion 198, base portion extension 200, and the body 196 of the latch portion 166, for example, along a central axis of the latch portion 166 (e.g., the central axis 185).

The passage 202 may have an inner perimeter 203, cross-sectional geometry, and/or profile (e.g., a shape, dimension, etc.) that corresponds to an outer perimeter 205, cross-sectional geometry, and or profile (e.g., a shape, dimension, etc.) of the protrusion 182. As mentioned above, the protrusion 182 may be received by the latch portion 166 to secure the handle portion 164 and the latch portion 166 to one another. More specifically, the protrusion 182 may be positioned to extend into the passage 202, and the outer perimeter 205 of the protrusion 182 may mate with the inner perimeter 203 of the passage 202. Thus, when the handle portion 164 and the latch portion 166 are coupled to one another in an assembled configuration, the handle portion 164 and the latch portion 166 may be rotationally fixed relative to one another, such that rotation of the handle portion 164 is imparted and/or transferred to the latch portion 166. In other words, the handle portion 164 and the latch portion 166 may rotate with one another, for example, to transition the handle assembly 158 between locked and unlocked positions. In one embodiment, the corresponding shapes or geometries of the protrusion 182 and the passage 202 may have straight edges or surfaces to block relative rotation therebetween. Furthermore, the corresponding shapes or geometries of the protrusion 182 and the passage 202 may be selected such that the handle portion 164 and the latch portion 166 fit together in a particular orientation relative to one another. For example, the particular relative orientation of the handle portion 164 and the latch portion 166 in the assembled configuration may be an orientation in which the grip point 186 and the hook 170 are oriented or aligned in a common direction (e.g., a common radial direction, relative to the central axis 185 of the handle assembly 158).

The hook cavity 204 may be a cavity, recess, or other depression formed in a side (e.g., lateral side) of the hook 170. In some embodiments, opposing sides (e.g., lateral sides) of the hook 170 may each have a corresponding hook cavity 204. In one embodiment, the hook cavity 204 may enable the hook 170 to elastically deform (e.g., against the enclosure 152) when the handle assembly 158 is in a locked position. In some embodiments, the hook cavity 204 may engage with and/or receive a member of the enclosure 152 to secure the access panel 156 in a closed or locked configuration. Furthermore, the opening 206 formed in the body 196 may be disposed on a side 207 (e.g., a top side) of the body 196 and may be positioned between the hook 170 and the base portion extension 200 (e.g., along the central axis 185 of the handle assembly 158). The opening 206 may extend from an exterior surface 209 of the body 196 to the passage 202. In the manner described below, the opening 206 may be configured to accommodate (e.g., receive) one of the teeth 194 of the protrusion 182 to enable securement of the handle portion 164 to the latch portion 166. To this end, the teeth 194 and the opening 206 may be formed on a common side of the handle assembly 158 (e.g., the handle portion 164 and the latch portion 166), such that the teeth 194 may extend into the opening 206 as the protrusion 182 is positioned within the passage 202 during assembly of the handle assembly 158.

Figure 8:
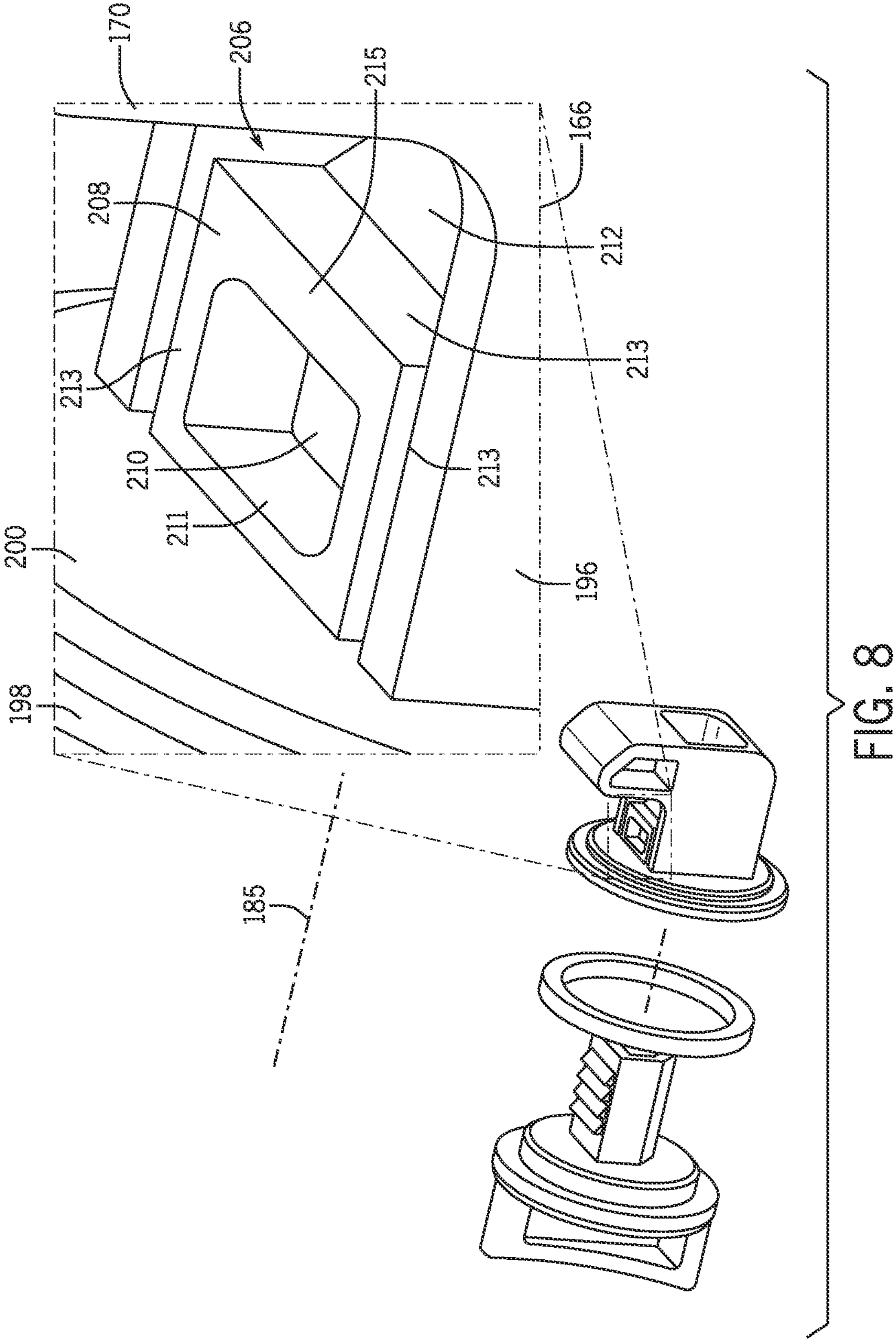
FIG. 8 is an expanded perspective view of an embodiment of a handle assembly, illustrating engagement between a handle portion and a latch portion of the handle assembly, in accordance with aspects of the present disclosure.

FIG. 8 is an expanded perspective view of an embodiment of the latch portion 166 of the handle assembly 158, illustrating the opening 206 extending into the body 196. As shown, the latch portion 166 includes a pawl base 208 extending from the base portion extension 200 into the opening 206. As similarly described above, the pawl base 208 may be integrally formed with the base portion extension 200, such that the pawl base 208 is an integrated feature of a single piece embodiment of the latch portion 166. For example, a first side 211 of the pawl base 208 may be integrally formed with the base portion extension 200, and the pawl base 208 may extend into the opening 206 from the base portion extension 200 such that remaining sides 213 of the pawl base 208 are suspended within the opening 206. Additionally, the pawl base 208 may include a slot 210 formed therein and/or therethrough. The slot 210 may extend from a first face 215 (e.g., side, surface) of the pawl base 208 facing away from (e.g., opposite) the passage 202 to a second face (e.g., side, surface) of the opening 206 facing the passage 202. In other words, the slot 210 may extend completely through the pawl base 208 (e.g., in a radial direction relative to the central axis 185 of the handle assembly 158).

The latch portion 166 also includes a pawl 212 extending from the pawl base 208. For example, the pawl 212 may generally extend from one of the remaining sides 213 opposite of the first side 211 attached to the base portion extension 200. The pawl 212 may extend toward and at least partially into the passage 202 (e.g., in a radial direction relative to the central axis 185 of the handle assembly 158). Thus, the pawl 212 may be configured to engage with one or more of the teeth 194 as the protrusion 182 is positioned within the passage 202 during assembly and/or installation of the handle assembly 158 with the access panel 156. Specifically, as the protrusion 182 is inserted into the passage 202, one or more of the teeth 194 may engage with and traverse the pawl 212 extending into the passage 202. As a result, the pawl 212 and/or the pawl base 208 may elastically deform to pass over the one or more teeth 194 until the handle portion 164 is disposed against the exterior surface 165 of the access panel 156, and the latch portion 166 is disposed against the interior surface 167 of the access panel 156. Once the handle portion 164 is disposed against the exterior surface 165 of the access panel 156 and the latch portion 166 is disposed against the interior surface 167 of the access panel 156, the pawl 212 may be engaged with one of the teeth 194 to enable retention of the handle assembly 158 in the installed configuration. As will be appreciated, the protrusion 182 includes multiple teeth 194 arrayed thereon, each of which may engage with the pawl 212. The particular tooth 194 with which the pawl 212 engages to retain the handle portion 164 against the exterior surface 165 of the access panel 156 and the latch portion 166 against the interior surface 167 of the access panel 156 may depend on a thickness of the access panel 156. Thus, the features of the handle assembly 158 described herein enable the handle assembly 158 to be tightly or snuggly secured to various access panels 156 having different thicknesses. To disassemble and remove the handle assembly 158 from the access panel 156, a user may insert a tool into the slot 210 to elastically deform (e.g., pry) the pawl base 208 and disengage the pawl 212 from the tooth 194 with which the pawl 212 is engaged. For example, a tool such as a screwdriver, a key, or any other suitable tool may be utilized to disengage the pawl 212 from the teeth 194.

Figure 9:
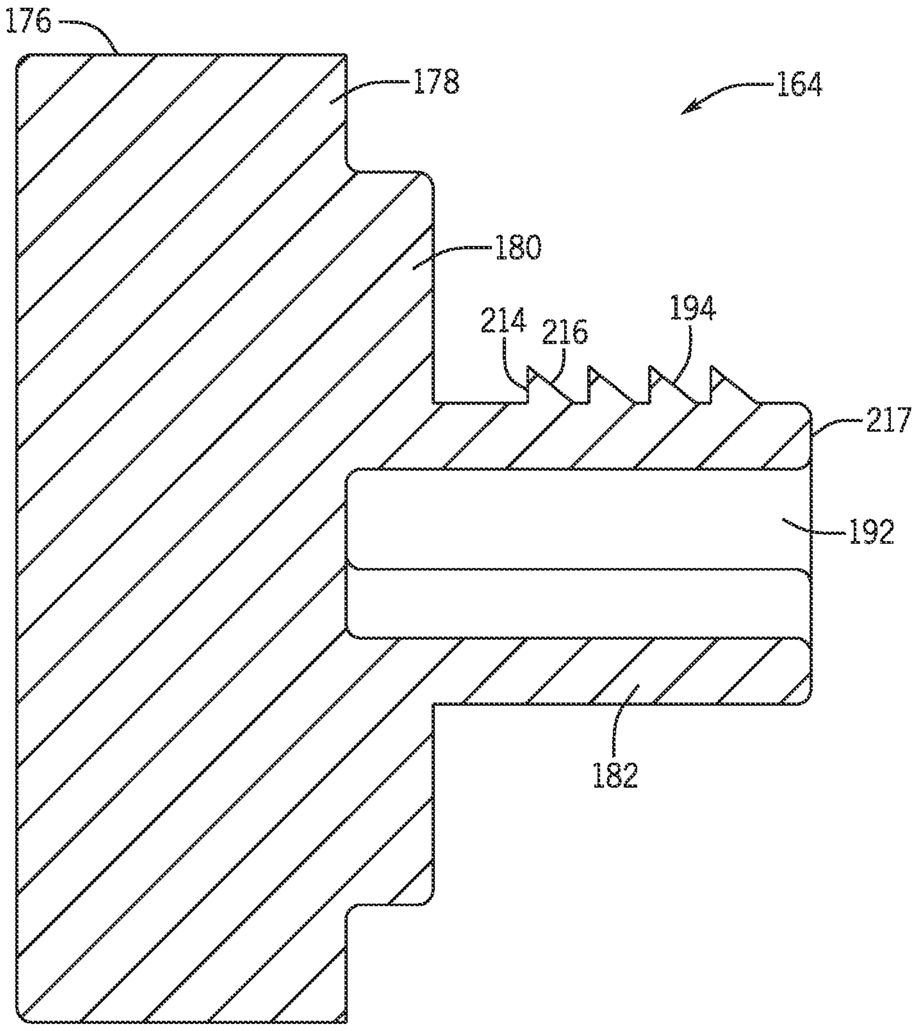
FIG. 9 is a cross-sectional side view of an embodiment of a handle portion of a handle assembly, in accordance with aspects of the present disclosure.

FIG. 9 is a cross-sectional side view of an embodiment of the handle portion 164 of the handle assembly 158, illustrating an example configuration and geometry of the teeth 194 formed on the protrusion 182. Each of the teeth 194 may include a radial tooth face 214 (e.g., a first face extending radially from the protrusion 182 relative to the central axis 185 of the handle assembly 158) and an angled tooth face 216 (e.g., a second face extending from the protrusion 182 at angle). As shown, the radial tooth face 214 faces the base extension 180 of the handle portion 164, and the angled tooth face 216 faces a distal end 217 of the protrusion 182. The radial tooth face 214 extends generally perpendicularly from the protrusion 182 and may catch and/or engage with the pawl 212 to retain the handle assembly 158 in the installed configuration. The angled tooth face 216 may extend from the protrusion 182 at an oblique angle and may enable and/or cause the pawl 212 to elastically deform and traverse (e.g., travel across or over) the respective tooth 194 during the installation process of the handle assembly 158 (e.g., as the protrusion 182 is inserted into the passage 202).

Figure 10:
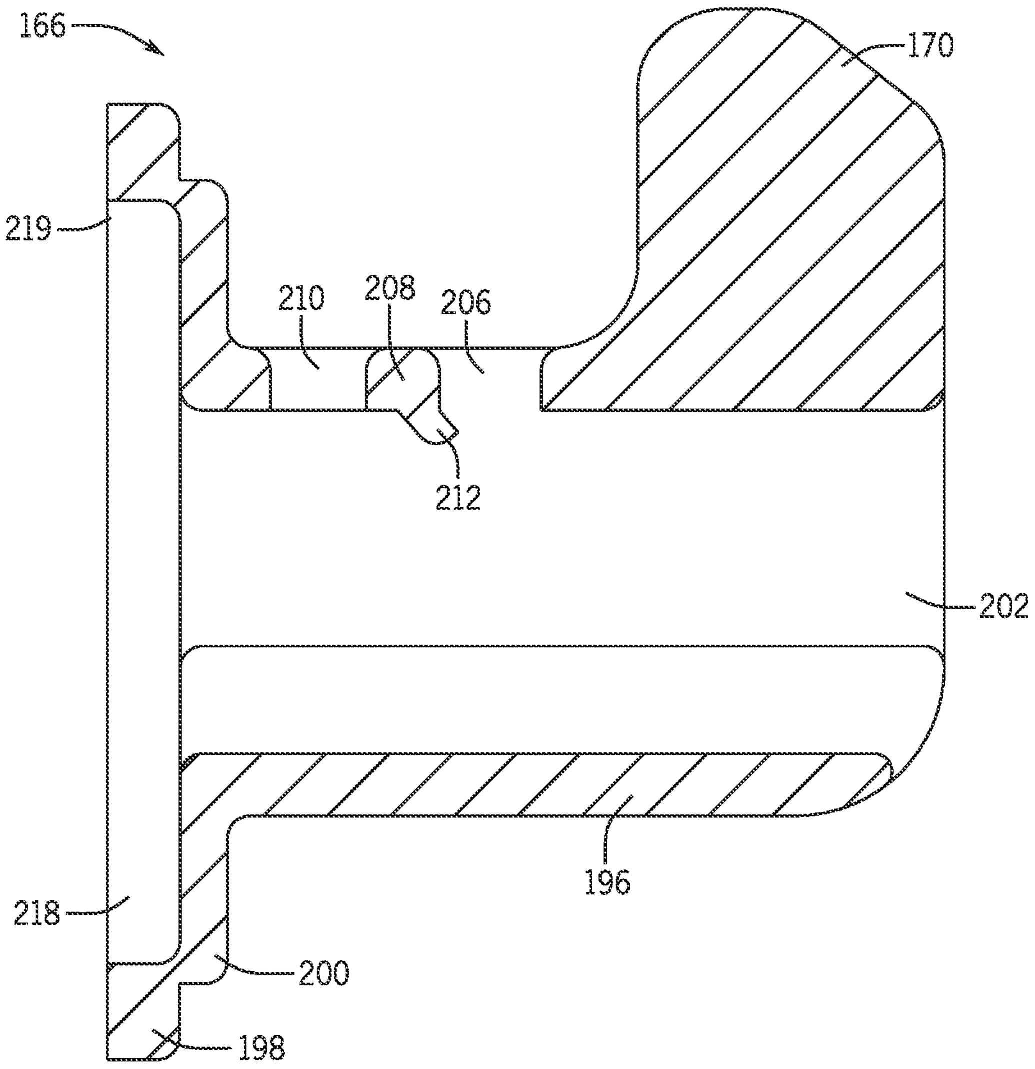
FIG. 10 is a cross-sectional side view of an embodiment of a latch portion of a handle assembly, in accordance with aspects of the present disclosure.

FIG. 10 is a cross-sectional side view of an embodiment of the latch portion 166 of the handle assembly 158. The latch portion 166 of the illustrated embodiment includes similar elements and element numbers as the embodiments described above. The latch portion 166 also includes a cavity 218 formed in the base portion 198. The cavity 218 may be a recess formed in a face of the base portion 198 that is disposed against the interior surface 167 of the access panel 156 in the installed configuration of the handle assembly 158. The cavity 218 may be circular in shape or may have another suitable shape. As shown, the cavity 218 may extend through the base portion 198 to the base portion extension 200. In one embodiment, a shape of a cross-sectional inner perimeter 219 (e.g., inner surface) of the cavity 218 may correspond to (e.g., be similar to) a shape or geometry (e.g., outer geometry, outer perimeter, etc.) of the base portion 198. Additionally, the cavity 218 may have a shape and/or dimensions similar to and/or slightly greater than the base extension 180 of the handle portion 164. As a result, the base extension 180 may extend into the cavity 218 in a tight or compact arrangement in the installed configuration. In some embodiments, the cavity 218 may also receive, accommodate, and/or retain the gasket 174. As will be appreciated, a distance by which the base extension 180 extends into the cavity 218 may vary depending on a thickness of the access panel 156 to which the handle assembly 158 is secured.

Figure 11:
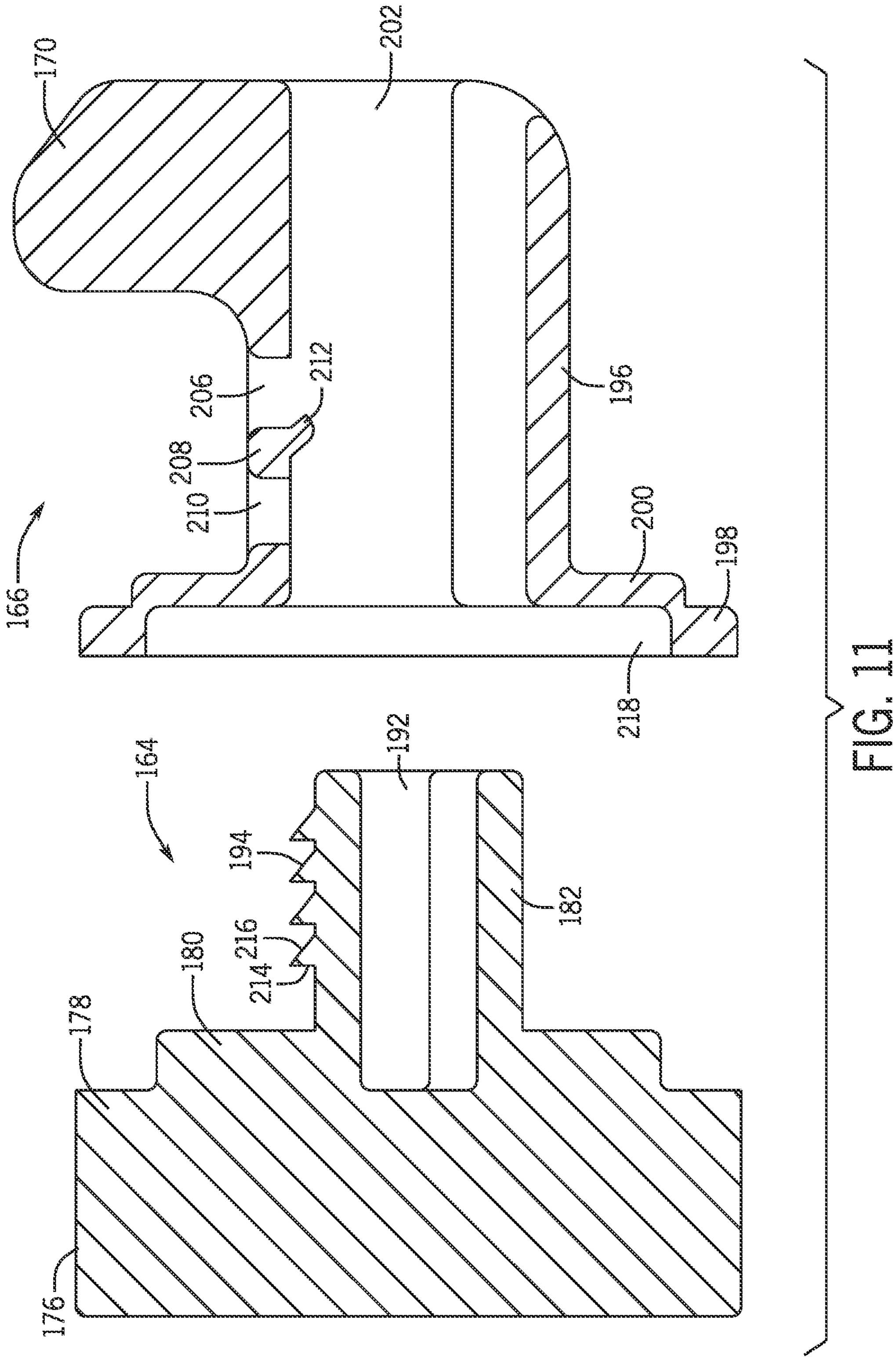
FIG. 11 is a cross-sectional side view of an embodiment of a handle assembly, illustrating an assembled configuration of the handle assembly, in accordance with aspects of the present disclosure.

FIG. 11 is a cross-sectional view of an embodiment of the handle assembly 158, illustrating an installed or assembled configuration of the handle assembly 158. In one embodiment, the protrusion 182 of the handle portion 164 may be inserted through the opening 159 of the access panel 156 and into the passage 202 of the latch portion 166. As the protrusion 182 translates into the installed configuration, the pawl 212 may elastically deform to translate over the angled tooth face 216 of each of the teeth 194. The base extension 180 may also translate into the cavity 218, which may include the gasket 174 disposed therein, to create a sealing engagement or interface. Once the base 178 of the handle portion 164 is disposed against the exterior surface 165 of the access panel 156 and the base portion 198 of the latch portion 166 is disposed against the interior surface 167 of the access panel 156, the pawl 212 may engage with the radial tooth face 214 of one of the teeth 194 (e.g., the last tooth 194 across which the pawl 212 traversed during installation). Once the pawl 212 is engaged with the radial tooth face 214, the handle assembly 158 may be retained in the installed configuration with the access panel 156. Thereafter, the handle assembly 158 may be used (e.g., actuated, manipulated) to open, close, lock, and unlock the access panel 156 relative to the enclosure 152.

Figure 12:
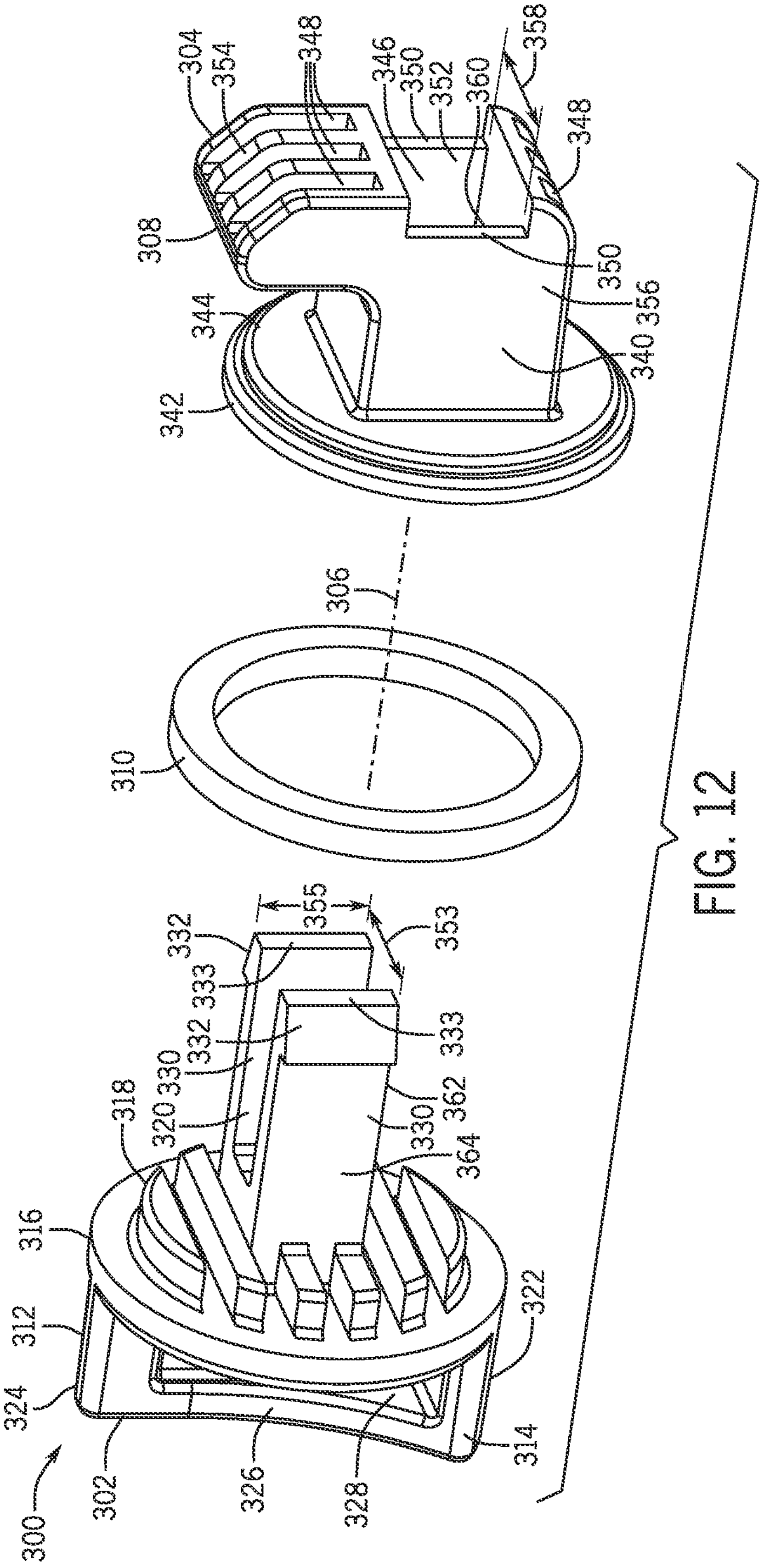
FIG. 12 is an exploded perspective view of an embodiment of a handle assembly, in accordance with aspects of the present disclosure.

In accordance with the presently disclosed techniques, other embodiments of the handle assembly 158 may include other features instead of, or in addition to, features of the handle assembly 158 discussed above with reference to FIGS. 6-11. For example, FIG. 12 is an exploded perspective view of another embodiment of the handle assembly 158, which is described in the following discussion as a handle assembly 300. As similarly discussed above, the handle assembly 300 is configured to be installed with the access panel 156 without use of tools and to also enable positional adjustment and securement of the access panel 156 relative to the enclosure 152 of the HVAC system 150. It should be understood that the handle assembly 300 described below may have one or more features, characteristics, or qualities similar to those discussed above with reference to FIGS. 6-11. For example, the handle assembly 300 may be formed from a polymer, may include components formed via a molding process (e.g., injection molding), and so forth.

The handle assembly 300 (e.g., latch assembly) includes a handle portion 302 (e.g., first portion, a handle) and a latch portion 304 (e.g., second portion). In an uninstalled configuration, the handle portion 302 and the latch portion 304 are separate pieces. In certain embodiments, the handle portion 302 and the latch portion 304 may each be a single, integrally formed piece. In an installed configuration, the handle portion 302 and the latch portion 304 may be disposed on opposite sides of the access panel 156 with respect to one another. For example, the latch portion 304 may be disposed on and/or against the interior surface 167 (e.g., inner side, first side) of the access panel 156, and the handle portion 302 may be disposed on and/or against the exterior surface 165 (e.g., outer side, second side) of the access panel 156. The handle portion 302 may engage the latch portion 304 via the opening 159 in the access panel 156 in the installed configuration. Additionally, in the installed configuration, a position of the handle portion 302 relative to the latch portion 304 may be generally fixed. That is, the handle portion 302 and the latch portion 304 may be rotationally fixed relative to one another, as similarly described above. In some embodiments, the handle assembly 300 (e.g., components of the handle assembly 300, handle portion 302, latch portion 304, etc.) may be formed from a polymer via an injection molding process, an additive manufacturing process (e.g., three-dimensional printing process), a subtractive manufacturing process, or other suitable manufacturing process. In other embodiments, the handle assembly 300 may be formed from a metal, a composite material, a ceramic material, or other suitable material.

In the installed configuration with the access panel 156, a user may utilize the handle assembly 300 to manipulate a position of the access panel 156 relative to the enclosure 152. In particular, the user may grip the handle portion 302 in order to adjust the handle assembly 300 between locked and unlocked positions, adjust the access panel 156 between open and closed positions, and so forth. For example, as the handle portion 302 and latch portion 304 may be rotationally fixed relative to one another, the user may rotate the handle portion 302 to thereby rotate the latch portion 304. During rotation, the handle assembly 300 may rotate about an axis 306 (e.g., a central axis of the handle assembly 300) extending crosswise from the access panel 156. In order to secure the access panel 156 in a closed position with the enclosure 152, the latch portion 304 may include a hook 308 (e.g., a hook portion) configured to selectively engage with the enclosure 152. For example, the hook 308 may be a lateral extension extending from a main body 340 of the latch portion 304. Rotation of the handle assembly 300 may transition the handle assembly 300 between an unlocked position and a locked position. When the access panel 156 is in a closed position with the enclosure 152 and the hook 308 is in the locked position, the hook 308 may engage with one of the walls 157 of the enclosure 152, with an additional structure of the wall 157, another structural member of the enclosure 152, or any other suitable feature. In some embodiments, the hook 308 may be configured to elastically deform in the locked position, such as via engagement with the wall 157. This deformation may maintain the handle assembly 300 in the locked position and may reduce vibration or another force that may inadvertently dislodge and/or transition the handle assembly 300 into an unlocked position.

In the installed configuration, a gasket 310 may be included to create a seal between the handle assembly 300 and the access panel 156. For example, the gasket 310 may block transfer of air, heat, and/or debris between the external environment and the interior volume 155 of the enclosure 152. The gasket 310 may be composed of a polymer, elastomer, soft metal, closed cell foam, or any other compressible material suitable for establishing a sealing interface between components. In an installed configuration, the gasket 310 may be disposed between the handle portion 302 and the access panel 156, between the latch portion 304 and the access panel 156, between the handle portion 302 and the latch portion 304 (e.g., and within the opening 159 of the access panel 156), or any combination thereof. In one embodiment, multiple gaskets 310 may be included with the handle assembly 300. For example, one gasket 310 may be disposed between the handle portion 302 and the exterior surface 165 of the access panel 156, and another gasket 310 may be disposed between the interior surface 167 and the latch portion 304. In certain embodiments, a thickness of the gasket 310 may vary to accommodate different thicknesses of the access panel 156. For example, a user may select an embodiment of the gasket 310 having a greater relative thickness to seal the handle assembly 300 against an embodiment of the access panel 156 having a lesser relative thickness. As another example, a user may select an embodiment of the gasket 310 having a lesser relative thickness to seal the handle assembly 300 against and embodiment of the access panel 156 having a greater relative thickness.

As shown in the illustrated embodiment, the handle portion 302 may include a main body 312, a grip portion 314 (e.g., gripping portion, grip extension, a grip, etc.), a base 316 (e.g., cylindrical base), ribs 318 (e.g., rib extensions, protrusions), and prongs 320. In certain embodiments, the features of the handle portion 302 may be integrally formed with one another to form the handle portion 302 as a single piece component. In an installed configuration, a user may utilize and/or manipulate the grip portion 314 to rotate the handle assembly 300 between a locked position and an unlocked position, to open and close the access panel 156, and/or assemble and disassemble the handle assembly 300 (e.g., install and uninstall the handle assembly 300 with the access panel 156). Similar to the embodiment descried above with reference to FIG. 7, the grip portion 314 may have a grip base 322, a grip point 324, one or more grip side surfaces 326, and one or more grip side cavities 328 formed in the one or more grip side surfaces 326. The grip portion 314 may be attached to or integrally formed with the base 316 and may be exposed to an external environment (e.g., external to the enclosure 152) when installed with the access panel 156. The grip base 322 may be located on a lateral side, region, or edge of the handle portion 302 that is generally opposite the grip point 324. The grip base 322 may have a flat or curved surface spanning an edge of the handle portion 302 (e.g., along an arc of a circumference of the base 316) distal to the axis 306 of the handle portion 302 (e.g., the handle assembly 300).

The grip point 324 may be disposed on a side or region of the grip portion 314 generally opposite the grip base 322. Additionally, the grip point 324 may have a smaller circumferential dimension (e.g., arc length of the circumference of the base 316, smaller thickness, etc.) than that of the grip base 322. As a result, the grip portion 314, when viewed from an exterior of the enclosure 152, may resemble a triangle or arrowhead shape. In an assembled or installed configuration of the handle assembly 300, the grip point 324 may be aligned in a common direction with the hook 308. In this way, the grip portion 314 may be a visual indicator of an orientation of the hook 308, which may be occluded from view by the access panel 156. Specifically, a user may view the grip portion 314 from a location external to the enclosure 152 (e.g., with the latch portion 304 obscured by the access panel 156) and determine an orientation of the hook 308 to verify whether the handle assembly 300 is in a locked position (e.g., engaged with the enclosure 152) or an unlocked position (e.g., disengaged from the enclosure 152).

Additionally, the one or more grip side surfaces 326 may extend from the grip base 322 to the grip point 324 (e.g., two grip side surfaces 326 extending on opposing sides of the grip portion 314). The grip side surfaces 326 may be flat or curved and may surround and/or extend about one or more grip side cavities 328. The one or more grip side cavities 328 may be located on one or more sides of the grip portion 314 (e.g., formed in one or more of the grip side surfaces 326) and may accommodate one or more fingers of a user to enable the user to grip the handle portion 302 via the grip portion 314. In some embodiments, one or more surfaces of the grip portion 314 (e.g., grip side surfaces 326) may be textured or include a surface treatment to improve gripping of the grip portion 314. Furthermore, it should be understood that the geometry of the grip portion 314 may have other configurations, shapes, features, and so forth different than those described above.

The base 316 of the handle portion 302 may be generally cylindrical in shape (e.g., having a circular cross-sectional outer perimeter). Alternatively, the base 316 may have a cross-sectional or other geometry that is rectilinear, triangular, octagonal, or any other suitable shape. Additionally, the base 316 may, in an installed configuration, be disposed against the exterior surface 165 of the access panel 156 and may be at least partially disposed about the opening 159 (e.g., circular opening) formed in the access panel 156. Each of the ribs 318 may extend from the base 316 in a direction along the axis 306 and away from (e.g., opposite that of) the grip portion 314. Additionally, the ribs 318 may cooperatively form a generally cylindrical shape or profile (e.g., a circular cross-sectional outer perimeter) that may have a central axis collinear and/or aligned with the axis 306 of the handle portion 302 (e.g., handle assembly 300). The ribs 318 may also collectively define a profile having a smaller dimension (e.g., smaller diameter) than the base 316, and the ribs 318 may be spaced from one another along a surface of the base 316. Additional details of the ribs 318 are described further below.

The ribs 318, in an installed configuration of the handle assembly 300, may extend into and/or through the opening 159 formed in the access panel 156. In one embodiment, one or more surfaces of the ribs 318 (e.g., radially outward surfaces) may be in contact with an inner surface (e.g., circumferential surface) of the access panel 156 that defines the opening 159 of the access panel 156 through which a portion of the handle portion 302 extends in the installed configuration. To facilitate rotation of the handle assembly 300 within the opening 159 of the access panel 156, the ribs 318 may each be manufactured to have one or more smooth circumferential (e.g., radially outward) surfaces configured to abut the inner surface of the opening 159. Additionally or alternatively, the handle assembly 300 may be installed with the access panel 156 with a lubricant and/or coating disposed on portions of the ribs 318 to facilitate rotation of the handle assembly 300 relative to the access panel 156.

The prongs 320 (e.g., a first prong, a second prong, a plurality of prongs) may extend from the base 316 and/or the ribs 318 in a direction along the axis 306 and away from (e.g., opposite that of) the grip portion 314. Each prong 320 includes a body portion 330 extending from the base 316 and/or the ribs 318. Each body portion 330 may have a cross-sectional geometry that is rectilinear or another suitable shape. A respective tooth 332 (e.g., a first tooth, a second tooth) extends from each of the body portions 330 of the prongs 320. Each tooth 332 may extend crosswise from an end 333 (e.g., a distal end) of the respective body portion 330. In the illustrated embodiment, the handle portion 302 includes two prongs 320. Thus, the handle portion 302 includes two body portions 330 and two teeth 332. The teeth 332 extend in opposite directions from the axis 306 relative to one another. Each tooth 332 may have a cross-sectional geometry that is triangular, rectilinear, or another suitable shape for engaging the latch portion 304, as described further below.

To couple the handle portion 302 to the latch portion 304 and thereby couple the handle assembly 300 to the access panel 156, the handle portion 302 may be positioned adjacent to the exterior surface 165 of the access panel 156 and aligned with the opening 159 in the access panel 156, such that the prongs 320 extend through the opening 159 in the access panel 156. The latch portion 304 may be positioned adjacent the interior surface 167 of the access panel 156 and aligned with the opening 159 in the access panel 156. In this way, the prongs 320 may be received by the latch portion 304, as described further below.

In the illustrated embodiment, the latch portion 304 includes the main body 340 (e.g., a main body, latch body, etc.), a base portion 342, a base portion extension 344, a passage 346 (e.g., an opening, an aperture, etc.), the hook 308, cavities 348 formed in the hook 308, and tooth recesses 350 (e.g., tooth slot, recess, etc.). In some embodiments, the latch portion 304 may be a single, integrally-formed piece having one or more of the features described herein. The main body 340 may be a central section of material of any suitable shape, and the passage 346 may extend through the main body 340 (e.g., along the axis 306) and may have an inner surface 352. The inner surface 352 may define a cross-sectional geometry corresponding to a cross-sectional outline cooperatively defined by the prongs 320 (e.g., a rectilinear shape corresponding to a width 353 of the prongs 320 and/or a height 355 of the prongs 320). The base portion 342, similar to the base 316 described above, may be cylindrical in shape and may be disposed against the interior surface 167 of the access panel 156 in the installed configuration of the handle assembly 300. The base portion extension 344 may extend from the base portion 342 and may also be cylindrical in shape. The passage 346 may extend through (e.g., entirely through) the base portion 342, base portion extension 344, and main body 340 of latch portion 304, for example, along the axis 306. The cavities 348 may extend into the latch portion 304 from a distal surface 354 (e.g., outer surface, rear surface, distal end, etc.) of the latch portion 304 (e.g., the main body 340). In particular, the cavities 348 may extend into the hook 308 along the axis 206. In some embodiments, the cavities 348 may also be formed in a portion of the latch portion 304 opposite the hook 308 with respect to the passage 346 and/or axis 306. In one embodiment, the cavities 348 may enable the hook 308 to elastically deform (e.g., against the enclosure 152) when the handle assembly 300 is in a locked position. Additionally, tooth recesses 350 (e.g., a first tooth recess, a second tooth recess) may be formed in the main body 340 (e.g., formed in the distal surface 354) of the latch portion 304. For example, the tooth recesses 350 may extend from the inner surface 352 to an outer surface 356 of the latch portion 304. The tooth recesses 350 may be formed in the main body 340 on opposite sides of the passage 346 with respect to the axis 306. In an assembled configuration of the handle assembly 300, each tooth 332 of the handle portion 302 may be disposed within and/or engage with one of the tooth recesses 350 to secure the handle portion 302 and the latch portion 304 to one another and to the access panel 156.

As mentioned above the passage 346 may have a cross-sectional geometry 360 or profile (e.g., a shape, dimension, etc.) that corresponds to a profile 362 (e.g., a shape, dimension, etc.) cooperatively defined by the prongs 320. For example, a width 358 of the passage 346 may correspond to a width cooperatively defined by the prongs 320. As a result, respective outer surfaces 364 (e.g., radially outward surfaces with respect to the axis 306) of the body portions 330 of the prongs 320 may abut, contact, and/or extend generally the inner surface 352 of the passage 346 when the prongs 320 extend into the passage 346 in the installed configuration of the handle assembly 300.

In some embodiments, during installation of the handle assembly 300, the body portions 330 of the prongs 320 may elastically deform (e.g., elastically deform inward toward the axis 306) to facilitate engagement between the teeth 332 of the prongs 320 and the tooth recesses 350. For example, a width 360 extending laterally between outer ends of the teeth 332 may be greater than the width 358 (e.g., a lateral width) of the passage 346. During installation and with the handle portion 302 positioned on a first side of the access panel 156 and the latch portion 304 positioned on a second side of the access panel 156, the prongs 320 of the handle portion 302 may be inserted through the opening 159 of the access panel 156 and into the passage 346 of the latch portion 304. As the prongs 320 are positioned within the passage 346, engagement between the teeth 332 and the inner surface 352 of the passage 346 may cause the body portions 330 to elastically deform toward each other (e.g., toward the axis 306) to enable translation of the prongs 320 through the passage 346.

In the installed configuration, the teeth 332 of the prongs 320 may ultimately be positioned external to the passage 346. That is, the prongs 320 may be translated through the passage 346 until the teeth 332 transition beyond the passage 346 along the axis 306 and engage with the tooth recesses 350. Once the teeth 332 extend beyond the passage 346, the body portions 330 may return to an original, undeformed state within the passage 346, thereby causing the teeth 332 to extend laterally outward (e.g., relative to the axis 306) within the tooth recesses 350. Thus, when the handle portion 302 and the latch portion 304 are coupled to one another in the assembled configuration, the handle portion 302 and the latch portion 304 may also be rotationally fixed relative to one another, such that rotation of the handle portion 302 is imparted and/or transferred to the latch portion 304. In other words, the handle portion 302 and the latch portion 304 may rotate with one another, for example, to transition the handle assembly 300 between locked and unlocked positions.

Figure 13:
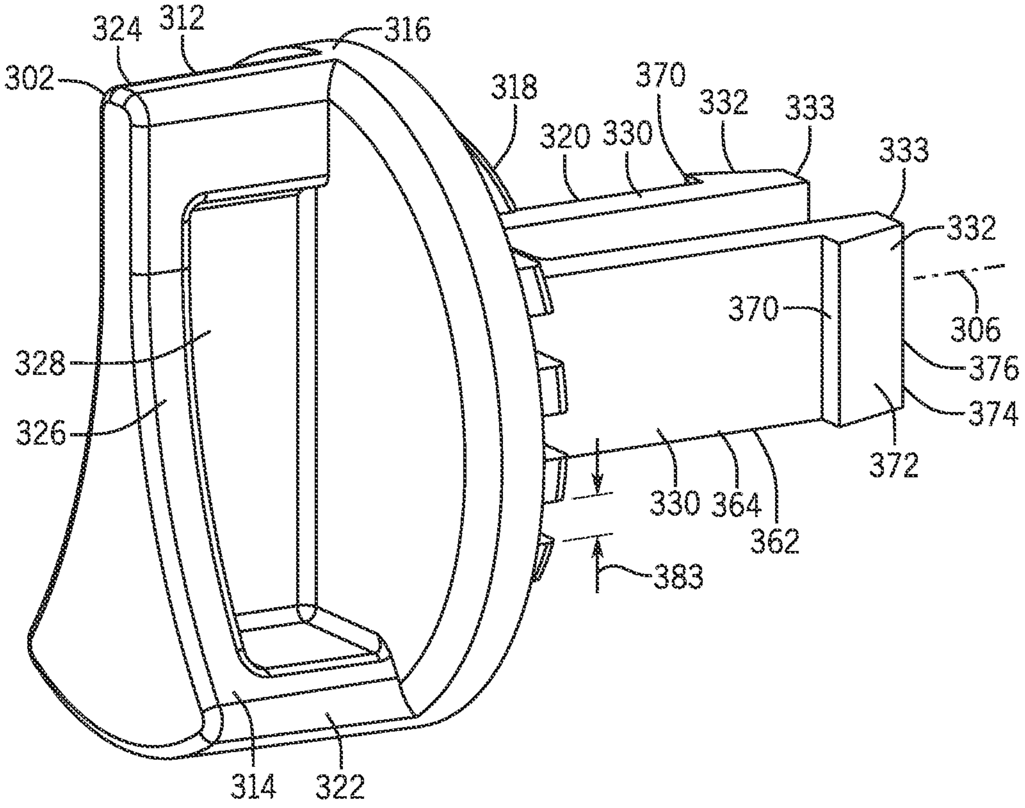
FIG. 13 is a perspective view of an embodiment of a handle portion of a handle assembly, in accordance with aspects of the present disclosure.
Figure 14:
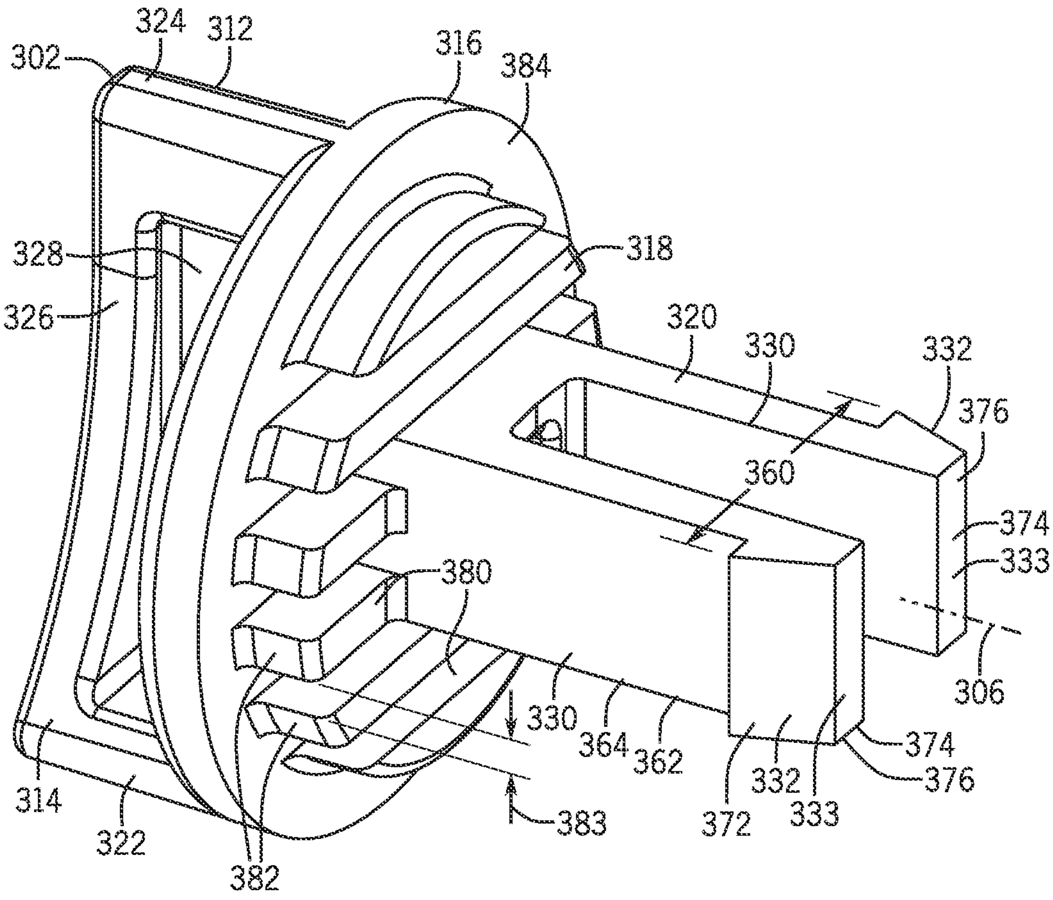
FIG. 14 is a perspective view of an embodiment of a handle portion of a handle assembly, in accordance with aspects of the present disclosure.

FIGS. 13 and 14 are perspective views of an embodiment of the handle portion 302 of the handle assembly 300, illustrating configurations and geometries of the prongs 320 and teeth 332. FIGS. 13 and 14 are discussed concurrently below. Each of the teeth 332 may include a radial tooth face 370 (e.g., a first face, a radially extending face, a lateral face) extending radially or laterally outward from the respective prong 320 relative to the axis 306 of the handle portion 302. Each of the teeth 332 may also include an angled tooth face 372 (e.g., a second face) extending from the prong 320 (e.g., the radial tooth face 370) at angle and an axial or distal tooth face 374. As shown, the radial tooth face 370 may generally face the ribs 318 and/or base 316 of the handle portion 302, and the angled tooth face 372 may generally face outward from the axis 306 and/or a distal end 376 of the respective prong 320. As shown, the angled tooth face 372 may be disposed at an oblique angle relative to the outer surface 364 of the respective body portion 330 of the prong 320. The axial tooth face 374 may be formed at the distal end 376 and/or may define the distal end 376 of the respective prong 320. The axial tooth face 374 may also extend radially or laterally outward relative to the axis 306.

During installation, the angled tooth face 372 may contact the inner surface 352 of the passage 346 as the prong 320 is inserted into the passage 346 of the latch portion 304 of the handle assembly 300, thereby causing the prong 320 to elastically deform and traverse the passage 346. As the prong 320 is transitioned further into the passage 346, the tooth 332 may ultimately extend beyond the passage 346, thereby causing the prong 320 to return to an undeformed state in which the tooth 332 is engaged with one of the tooth recesses 350 of the latch portion 304. Specifically, the tooth 332 may be disposed within one of the tooth recesses 350, such that the axial tooth face 374 engages and/or overlaps with the main body 340 of the latch portion 304 along the axis 306. In this way, unintentional removal of the handle portion 302 from the latch portion 304 (e.g., disassembly of the handle assembly 300) is blocked via engagement between the teeth 332 and the main body 340 of the latch portion 304.

As discussed above, the handle portion 302 includes ribs 318 that extend from the base 316 along the axis 306 in a direction opposite the grip portion 314 of the handle portion 302. In the illustrated embodiment, the ribs 318 also extend laterally (e.g., crosswise) relative to the axis 306. That is, the ribs 318 also generally extend laterally along a surface 384 of the base 316 from which the ribs 318 extend. Each of the ribs 318 may each include a rib body 380 and one or more radial rib surfaces 382 (e.g., outer surfaces, radially outer surfaces). In the illustrated embodiment, the ribs 318 are spaced apart from one another along the surface 384 to define gaps or channels 383 therebetween. As will be appreciated, the ribs 318 may provide certain functionality similar to that of the base extension 180 discussed above. For example, in an installed configuration of the handle assembly 300, the ribs 318 may be positioned within the opening 159 of the access panel 156. Thus, the ribs 318 may enable alignment between the handle portion 302, latch portion 304, and opening 159 of the access panel 156 during and after installation of the handle assembly 300. The ribs 318 may also enable desirable positional adjustment (e.g., rotation) of the handle assembly 300 relative to the access panel 156. To this end, the radial rib surfaces 382 may cooperatively define a general outer geometry, such as a circular or cylindrical geometry, that corresponds with a geometry of the opening 159 of the access panel 156. Thus, the ribs 318 may enable retention of the handle assembly 300 within the opening 159 of the access panel 156, improve rigidity of the handle assembly 300 in an installed configuration with the access panel 156, and enable level rotation of the handle assembly 300 about the axis 306.

Further, as the ribs 318 are spaced apart from one another to define the channels 383, the ribs 318 may define the general outer geometry corresponding to the geometry of the opening 159 of the access panel 156 while also reducing an amount of material (e.g., polymer) utilized to form the handle portion 302. That is, the radial rib surfaces 382 may generally cooperatively define an outer geometry even with the ribs 318 spaced apart from one another. As the handle portion 302 may be formed with the ribs 318 and without including material to occupy the channels 383, costs associated with manufacturing the handle assembly 300 may be reduced.

Figure 15:
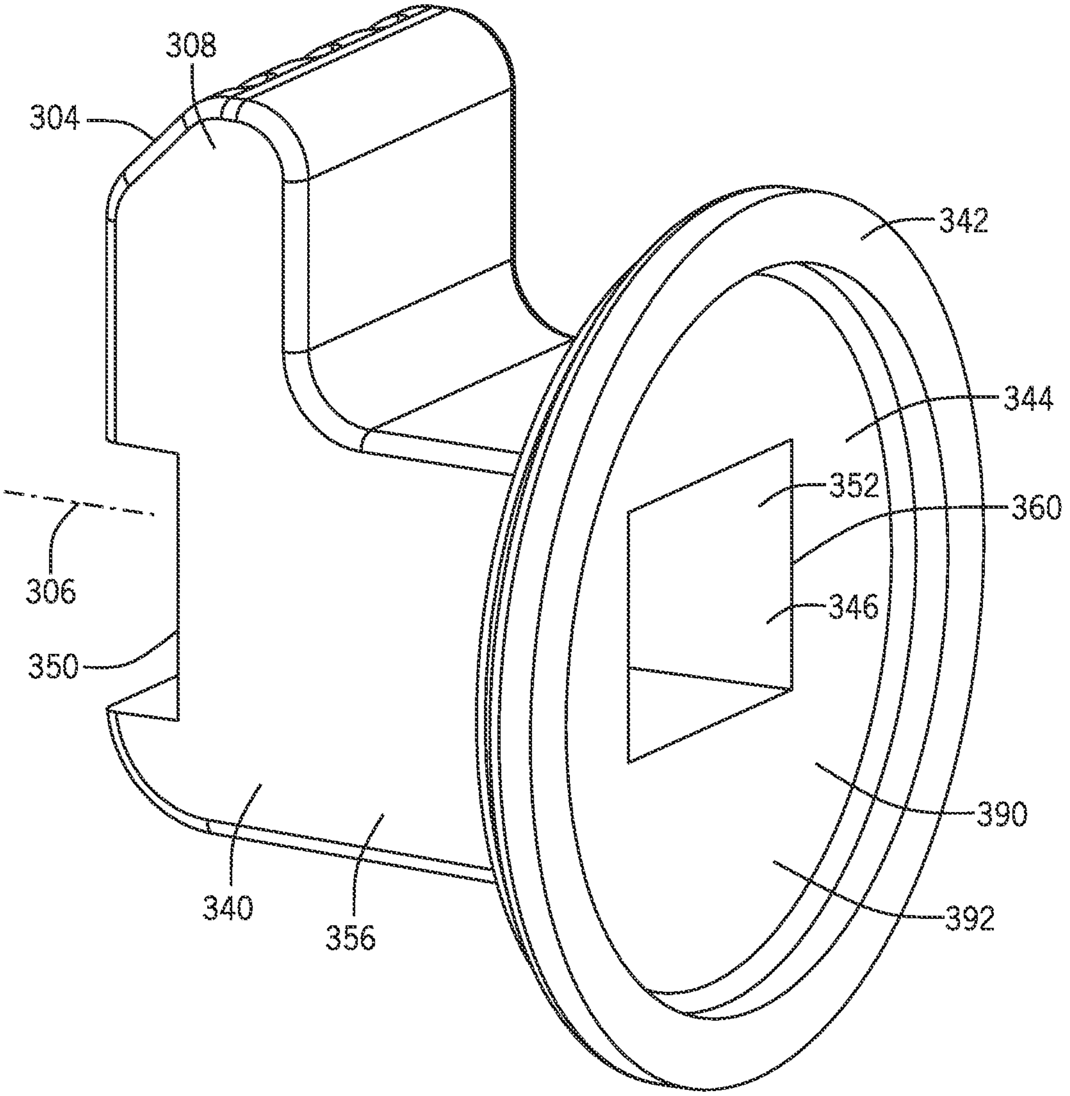
FIG. 15 is a perspective view of an embodiment of a latch portion of a handle assembly, in accordance with aspects of the present disclosure.
Figure 16:
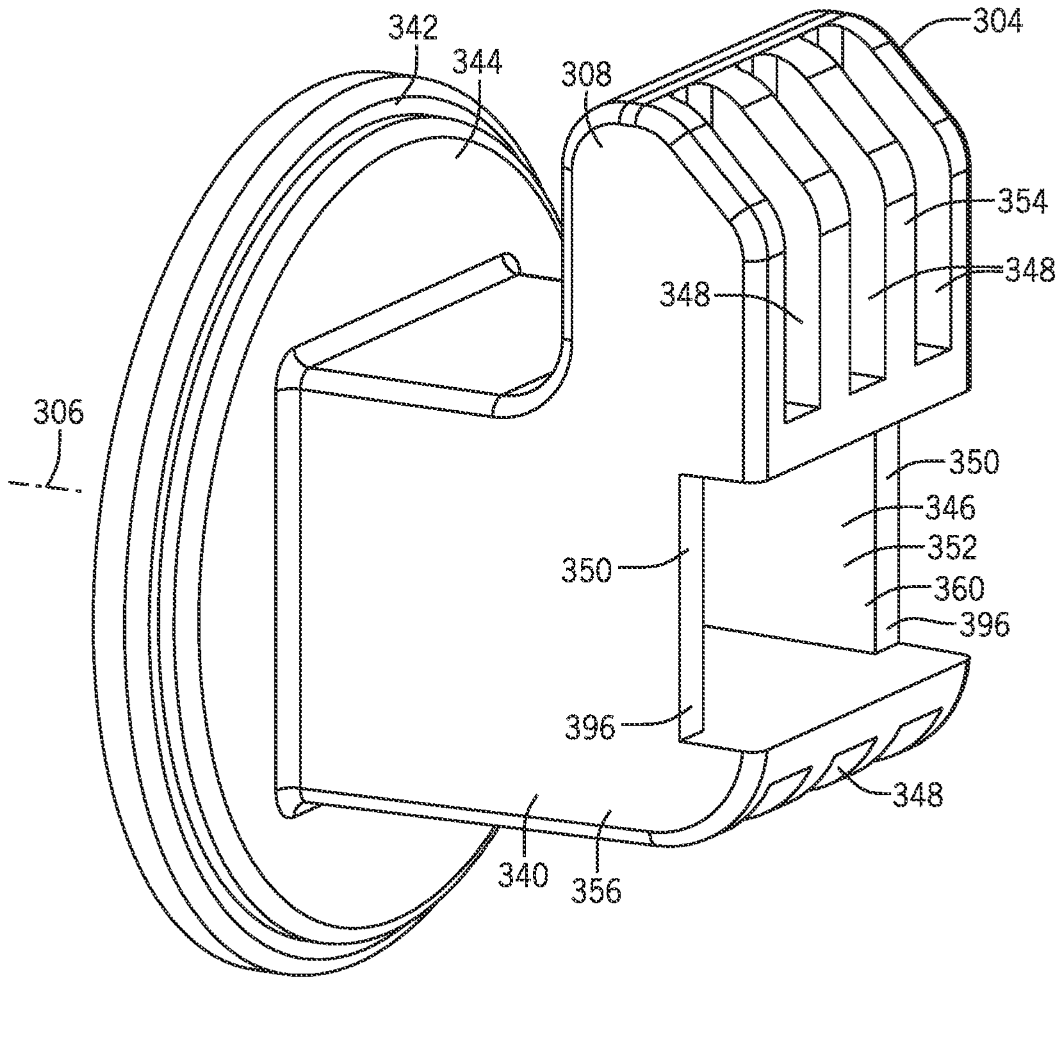
FIG. 16 is a perspective view of an embodiment of a latch portion of a handle assembly, in accordance with aspects of the present disclosure.

FIGS. 15 and 16 are perspective views of an embodiment of the latch portion 304 of the handle assembly 300 and are discussed concurrently below. The latch portion 304 of the illustrated embodiment includes similar elements and element numbers as embodiments of the latch portion 304 described above. The latch portion 304 also includes a cavity 390 formed in the base portion 342. The cavity 390 may be a recess formed in a face of the base portion 342 that is disposed against the interior surface 167 of the access panel 156 in the installed configuration of the handle assembly 300. The cavity 390 may be generally circular or cylindrical in shape or may have another suitable shape (e.g., having a circular cross-sectional outer perimeter). As shown, the cavity 390 may extend through the base portion 342 to the base portion extension 344. In one embodiment, a shape of a cross-sectional inner surface 392 of the cavity 390 may correspond to (e.g., be similar to) a shape or geometry (e.g., outer geometry, outer perimeter, etc.) of the base portion 342 and/or of the plurality of ribs 318.

Additionally, in some embodiments the cavity 390 may have a shape and/or dimensions corresponding to a shape and/or dimension cooperatively defined by the ribs 318 of the handle portion 302. In some instances, at least a portion of the ribs 318 (e.g., a portion of each rib 318) may extend through the opening 159 of the access panel 156 and into the cavity 390 in the installed configuration of the handle assembly 300. Thus, the radial rib surfaces 382 may be positioned radially within (e.g., relative to the axis 306) the base portion 342 and/or may face the base portion 342 in the installed configuration. In some embodiments, the cavity 390 may also receive, accommodate, and/or retain the gasket 310 (e.g., radially between the ribs 318 and the base portion 342, axially between the base 316 and the base portion extension 344, etc.).

The latch portion 304 may also include retention surfaces 396 (e.g., a first retention surface, a second retention surface). The retention surfaces 396 may be surfaces of the main body 340 and may define at least a portion of the tooth recesses 350. As shown, the retention surfaces 396 generally face a direction along the axis 306 opposite the base portion 342. The teeth 332 of the prongs 320 are configured to be disposed within and/or engage with the tooth recesses 350 of the latch portion 304 in the manner described above. More specifically, the teeth 332 may be at least partially disposed within the tooth recesses 350, such that the radial tooth faces 370 overlap (e.g., radially overlap relative to the axis 306) with the retention surfaces 396. The retention surfaces 396 may contact the radial tooth faces 370 in the installed configuration to block retraction of the handle portion 302 from the latch portion 304 (e.g., along the axis 306), thereby blocking unintentional or inadvertent disassembly of the handle portion 300 and/or uninstallation of the handle portion 300.

As mentioned above, the hook 308 and/or the body 340 of the latch portion 304 also includes the cavities 348 formed therein. In addition to the benefits described above, the cavities 348 may also enable utilization of less material to form the latch portion 304 of the handle assembly 300. By utilizing less material to form the latch portion 304, the handle assembly 300 may have a lighter-weight construction and may be manufactured at a reduced cost.

Figure 17:
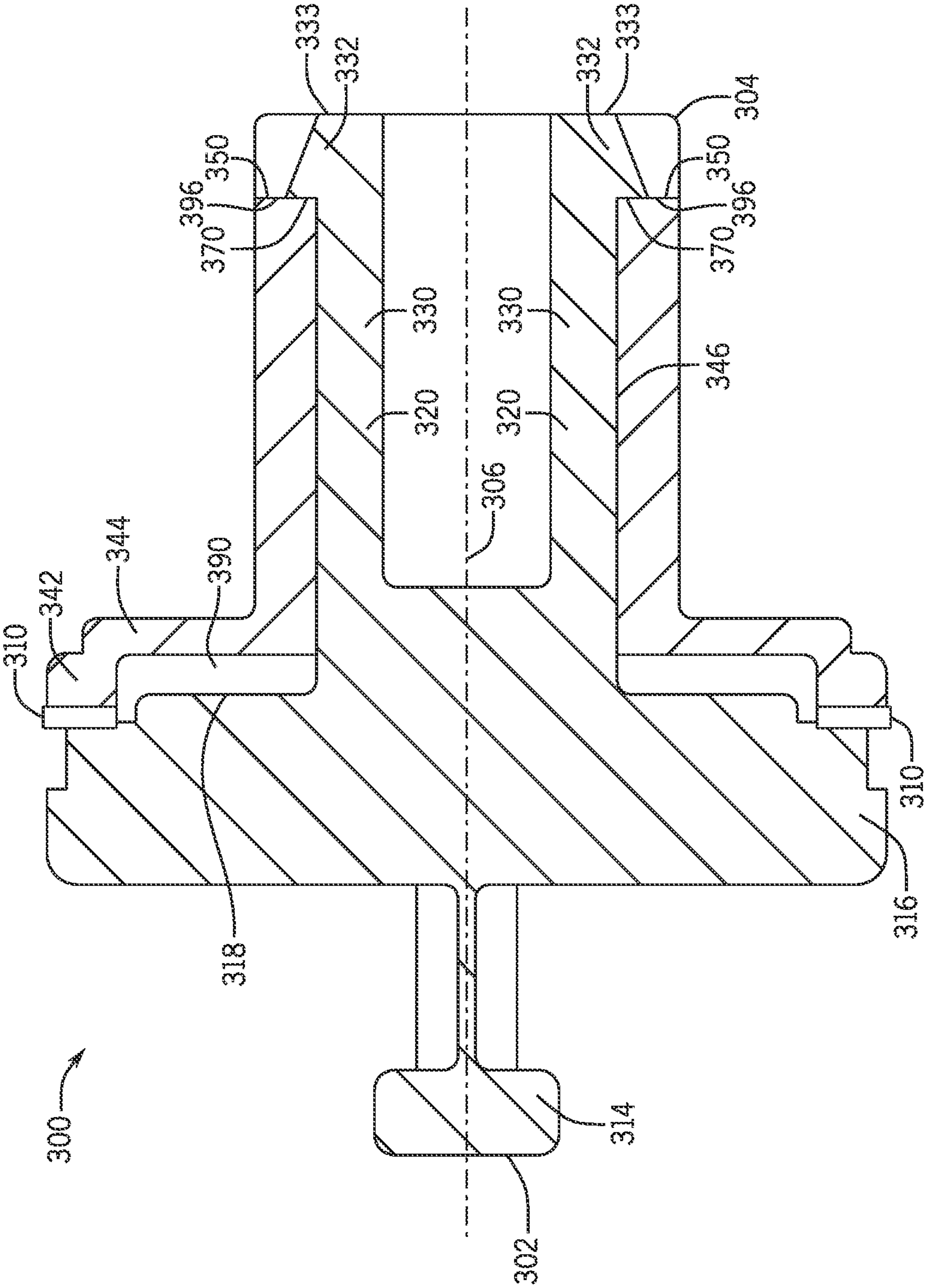
FIG. 17 is a cross-sectional side view of an embodiment of a handle assembly, illustrating an assembled configuration of the handle assembly, in accordance with aspects of the present disclosure.

FIG. 17 is a cross-sectional side view of an embodiment of the handle assembly 300, illustrating an assembled configuration of the handle assembly 300. As described above, the handle assembly 300 may be installed with the access panel 156 by inserting the prongs 320 of the handle portion 302 through the opening 159 of the access panel 156 and into the passage 346 of the latch portion 304. During transition of the prongs 320 into the installed configuration, the prongs 320 may elastically deform (e.g., elastically deform radially inward toward the axis 306) to translate through the passage 346. In particular, the prongs 320 may elastically deform due to the increased overall width or dimension extending between the teeth 332 as compared to the width of the passage 346. As the prongs 320 are transitioned further into the passage 346, the teeth 332 may extend beyond the passage 346, such that the prongs 320 may return to an undeformed state, whereby the teeth 332 may be disposed within the tooth recesses 350, as shown. Within the tooth recesses 350, the teeth 332 are engaged with the main body 340 of the latch portion 304. Specifically, the radial tooth faces 370 may abut, overlap, and/or engage with the retention surfaces 396 of the latch portion 304. In this way, the handle portion 302 and the latch portion 304 may be coupled and secured to one another with the access panel 156 captured therebetween. Thereafter, the handle assembly 300 may be manipulated or otherwise utilized to open, close, lock, and unlock the access panel 156 relative to the enclosure 152.

In certain embodiments, the prongs 320 may also be elastically deformable to disengage the teeth 332 (e.g., the first tooth and the second tooth) from the tooth recesses 350 (e.g., the first tooth recess and the second tooth recess to release) the handle portion 302 from the latch portion 304. Specifically, to disassemble the handle assembly 300 and/or uninstall the handle assembly 300 from the access panel 156, the teeth 332 of the prongs 320 may be biased (e.g., manually forced) radially inward relative to the axis 306, such that the radial tooth faces 370 do not engage, abut, or overlap with the retention surfaces 396 of the latch portion 304. Thereafter, the handle portion 302 may be retracted from the latch portion 304 along the axis 306, to transition the prongs 320 through the passage 346 until the prongs 320 are removed from the passage 346 and the handle is decoupled from the latch portion 304. In this way, the handle assembly 300 may be readily uninstalled or disassembled as desired.

As set forth above, embodiments of the present disclosure may provide one or more technical effects useful during the installation of a handle assembly with an access panel for an HVAC system enclosure. For example, embodiments are directed to a handle assembly configured to be installed with access panels of varying thickness and/or without the use of tools. To this end, the handle assembly includes a handle portion configured to be disposed against an exterior surface of the access panel and a latch portion configured to be disposed against an interior surface of the access panel. The handle portion includes a protrusion, such as a prong, that is configured to extend into a passage of the latch portion. In some embodiments, a pawl of the latch portion may engage with teeth of the protrusion of the handle portion to secure the latch portion and the handle portion to one another at different locations along the protrusion. In this way, the disclosed embodiments enable the handle assembly to be installed on access panels of varying thickness while maintaining tight securement of the handle assembly to the access panel. In some embodiments, the protrusion of the latch portion may include a plurality of prongs having teeth configured to engage with tooth recesses of the handle portion to secure the latch portion and the handle portion to one another about the access panel 156. In this way, the handle assembly may be securely installed with access panels without the use of tools, thereby facilitating improved installation of the handle assembly with access panels. The technical effects and technical problems in the specification are examples and are not limiting. It should be noted that the embodiments described in the specification may have other technical effects and can solve other technical problems.

While certain features and embodiments of the disclosure have been illustrated and described, many modifications and changes may occur to those skilled in the art, such as variations in sizes, dimensions, structures, shapes and proportions of the various elements, values of parameters including temperatures and pressures, mounting arrangements, use of materials, colors, orientations, etc., without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112 (f). However, for any claims containing elements designated in any other manner, it is intended that such elements are not to be interpreted under 35 U.S.C. 112 (f).

The invention claimed is:

1. A handle for an access panel of a heating, ventilation, and air conditioning (HVAC) system, comprising:

a handle portion configured to be disposed on a first side of the access panel, wherein the handle portion comprises a base, a grip portion extending from the base in a first direction, a plurality of ribs, a first prong comprising a first tooth, and a second prong comprising a second tooth, wherein the first prong and the second prong are configured to extend through the access panel, and wherein the first prong, the second prong, and the plurality of ribs each extend directly from a common surface of the base in a second direction opposite the first direction;

a latch portion configured to be disposed on a second side of the access panel, wherein the latch portion comprises a passage extending therethrough and configured to receive the first prong and the second prong, wherein the latch portion comprises a first tooth recess and a second tooth recess, wherein the first tooth is configured to engage with the first tooth recess and the second tooth is configured to engage with the second tooth recess to secure the handle portion and the latch portion to one another and to secure the handle to the access panel in an installed configuration of the handle; and a gasket configured to be disposed between the handle portion and the latch portion in the installed configuration of the handle, wherein the handle is adjustable, relative to the access panel, between a first position and a second position in the installed configuration.

2. The handle of claim 1, wherein the latch portion comprises a cavity configured to receive the plurality of ribs in the installed configuration.

3. The handle of claim 2, wherein the base and the cavity each comprise a circular cross-sectional outer perimeter, and wherein the handle is rotatable, relative to the access panel, between the first position and the second position in the installed configuration.

4. The handle of claim 1, wherein the handle portion is a single piece formed from a polymer.

5. The handle of claim 1, wherein the latch portion is a single piece formed from a polymer.

6. The handle of claim 5, wherein the first tooth comprises a first face extending laterally from the first prong and a second face extending from the first face at an oblique angle relative to the first prong, and wherein the second tooth comprises a third face extending laterally from the second prong and a fourth face extending from the third face at an oblique angle relative to the second prong.

7. The handle of claim 6, wherein the first tooth recess comprises a first retention surface configured to contact the first face of the first tooth, wherein the second tooth recess comprises a second retention surface configured to contact the third face of the second tooth, and wherein the first retention surface and the second retention surface block movement of the handle portion relative to the latch portion.

8. The handle of claim 1, wherein the first prong and the second prong are configured to elastically deform inward, relative to a central axis of the handle portion, during transition of the first prong and the second prong through the passage of the latch portion.

9. The handle of claim 1, wherein the latch portion comprises a hook portion configured to engage with an enclosure of the HVAC system having the access panel in the first position of the handle to secure the access panel in a closed position, and the hook portion is configured to disengage from the enclosure in the second position of the handle to enable translation of the access panel to an open position.

10. The handle of claim 9, wherein the grip portion is configured to enable adjustment of the handle between the first position and the second position, and the grip portion comprises a geometry indicative of an orientation of the hook portion.

11. A heating, ventilation, and air conditioning (HVAC) system, comprising:

an enclosure comprising an access panel configured to enable selective access to an interior volume of the enclosure; and a latch assembly coupled to the access panel, wherein the latch assembly is configured to engage and disengage with the enclosure to enable securement of the access panel in a closed position, wherein the latch assembly comprises:

a handle portion comprising a base, a grip portion extending from the base in a first direction, a plurality of ribs extending from the base in a second direction opposite the first direction, a first prong and a second prong extending from the base in the second direction, a first tooth extending from the first prong, and a second tooth extending from the second prong; and a latch portion comprising a main body, a passage extending through the main body, a first tooth recess formed in the latch portion, and a second tooth formed in the latch portion, wherein the first prong and the second prong extend through the access panel and into the passage, the first tooth is disposed within the first tooth recess, and the second tooth is disposed within the second tooth recess to secure the handle portion and the latch portion to one another and to the access panel.

12. The HVAC system of claim 11, wherein the latch portion comprises a cavity, and the plurality of ribs is at least partially disposed within the cavity.

13. The HVAC system of claim 11, wherein the first tooth recess and the second tooth recess are formed in a distal end of the latch portion.

14. The HVAC system of claim 11, wherein the latch assembly comprises a gasket disposed about the plurality of ribs and between the handle portion and the latch portion.

15. The HVAC system of claim 11, wherein the first prong and the second prong are integrally formed with the handle portion and are configured to elastically deform toward a central axis of the handle portion.

16. The HVAC system of claim 11, wherein the first prong, the second prong, and the plurality of ribs extend directly from a common surface of the base in the second direction.

17. A heating, ventilation, and air conditioning (HVAC) system, comprising:

a latch configured to couple to an access panel of the HVAC system, wherein the latch comprises:

a first portion configured to be disposed on a first side of the access panel, wherein the first portion comprises a base, a grip portion extending from the base in a first direction, a plurality of ribs, a first prong having a first tooth, and a second prong having a second tooth, wherein the first prong and the second prong are configured to extend through an opening of the access panel, and wherein the first prong, the second prong, and the plurality of ribs each extend directly from a common surface of the base in a second direction opposite the first direction;

a second portion configured to be disposed on a second side of the access panel, wherein the second portion comprises a latch body, a passage formed in the latch body, a first tooth recess formed in a distal end of the latch body, and a second tooth recess formed in the distal end of the latch body, wherein the first prong and the second prong are configured to be disposed within the passage and the first tooth and the second tooth are configured to engage with the first tooth recess and the second tooth recess, respectively, to secure the first portion and the second portion to one another and to the access panel in an installed configuration; and wherein the latch is configured to rotate, relative to the access panel, between a first position and a second position to engage and disengage, respectively, with an enclosure of the HVAC system to enable selective securement of the access panel to the enclosure in a closed position.

18. The HVAC system of claim 17, wherein the first portion is a first integrally formed piece, and the second portion is a second integrally formed piece.

19. The HVAC system of claim 17, wherein the first portion and the second portion are each formed from a polymeric material, and the first prong and the second prong are elastically deformable to disengage the first tooth and the second tooth from the first tooth recess and the second tooth recess, respectively, to release the first portion from the second portion.

* * * * *